(12) United States Patent
Yoda et al.

(10) Patent No.: US 7,096,075 B2
(45) Date of Patent: Aug. 22, 2006

(54) APPARATUS, METHOD AND PROGRAM FOR PHYSICAL STATE CONTROLLER

(75) Inventors: Kunikazu Yoda, Kanagawa-ken (JP); Hiroyuki Okano, Hachiohji (JP)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 10/827,869

(22) Filed: Apr. 20, 2004

(65) Prior Publication Data

US 2004/0210324 A1 Oct. 21, 2004

(30) Foreign Application Priority Data

Apr. 21, 2003 (JP) ............................ 2003-115246

(51) Int. Cl.
*G05B 13/02* (2006.01)
(52) U.S. Cl. .................. 700/32; 700/33; 700/153; 700/207; 148/121; 148/112; 148/641
(58) Field of Classification Search .................. 700/32, 700/33, 11, 145, 147, 149, 153, 207; 419/29; 148/121, 641, 112
See application file for complete search history.

(56) References Cited

U.S. PATENT DOCUMENTS

| | | | | |
|---|---|---|---|---|
| 5,616,187 | A * | 4/1997 | Nelson ....................... | 148/333 |
| 5,727,127 | A * | 3/1998 | Schulze Horn et al. ........ | 706/52 |
| 6,231,685 | B1 * | 5/2001 | Anderson ................... | 148/120 |
| 6,264,770 | B1 * | 7/2001 | Hong et al. ................. | 148/663 |
| 6,411,944 | B1 * | 6/2002 | Ulyanov ...................... | 706/13 |
| 6,471,787 | B1 * | 10/2002 | Cicale' et al. .............. | 148/113 |
| 6,531,007 | B1 * | 3/2003 | Nilsson et al. .............. | 148/658 |
| 6,797,081 | B1 * | 9/2004 | Hasegawa et al. .......... | 148/539 |
| 6,852,180 | B1 * | 2/2005 | Faral et al. ................. | 148/547 |
| 6,896,034 | B1 * | 5/2005 | Strezov et al. .............. | 164/452 |

FOREIGN PATENT DOCUMENTS

| | | | |
|---|---|---|---|
| JP | 62185833 A | * | 8/1987 |
| JP | 11-291021 | | 10/1999 |
| WO | WO 9854371 A1 | * | 12/1998 |

* cited by examiner

*Primary Examiner*—Anthony Knight
*Assistant Examiner*—Thomas Pham
(74) *Attorney, Agent, or Firm*—Wan Yee Cheung, Esq.; Kin-Wah Tong, Esq.; Patterson & Sheridan, L.L.P.

(57) ABSTRACT

For determination as to whether there is a possibility that temperature control satisfying conditions according to an upper limit LH_i and a lower limit LL_i of the annealing control temperatures of annealing object steel sections i will be realized under restrictions on limit values U and D of the control temperature increase and decrease rates, computation is performed without using dynamic programming requiring an enormous amount of data on a continuous annealing line of a steelwork. Annealing object steel sections in an annealing object steel band 12 to be computed are assigned numbers 1, 2, . . . , n in order from the first time division in the direction of movement. T_i is a time required to pass the annealing object steel section i through a predetermined point at which the steel section undergoes temperature control. LH_1=LL_1=b is given. X_i=[IL_i−D*T_i, IH_i+U*T_i] is computed. When X_ÇL_i¹f, Y_i=X_iÇL_i. When X_i ÇL_i=f, Y_i=X_i. Y_i is computed from i=1 to i=n in ascending order.

32 Claims, 17 Drawing Sheets

[Figure 1]
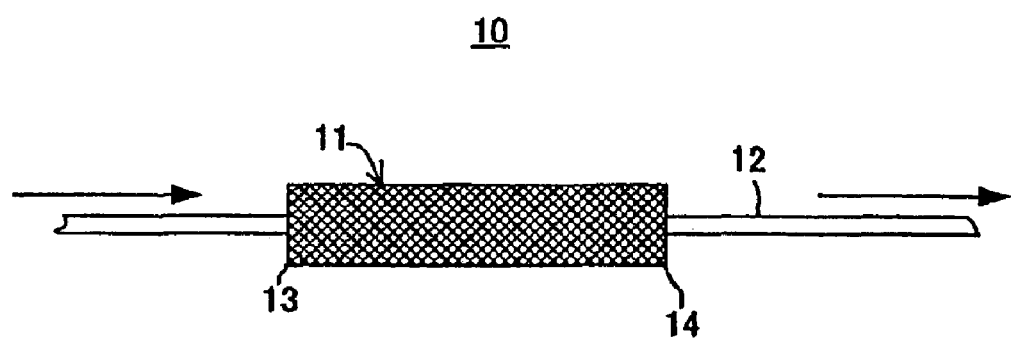

[Figure 2]
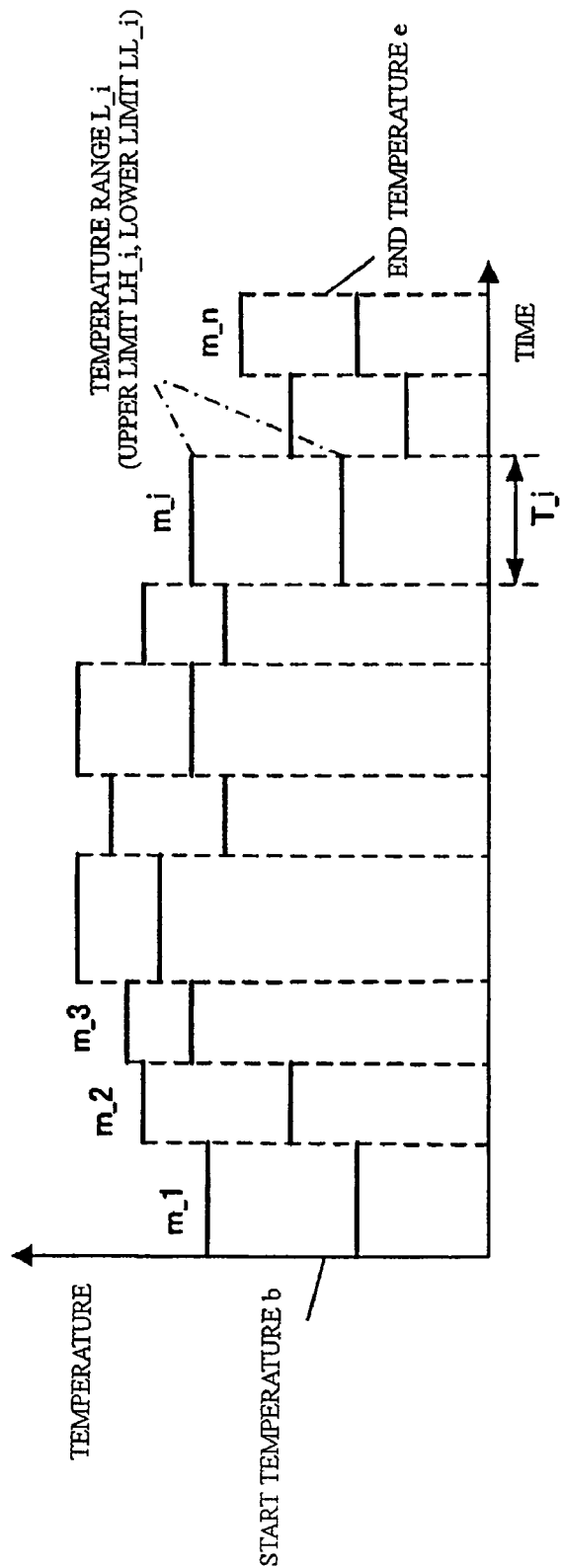

[Figure 3]
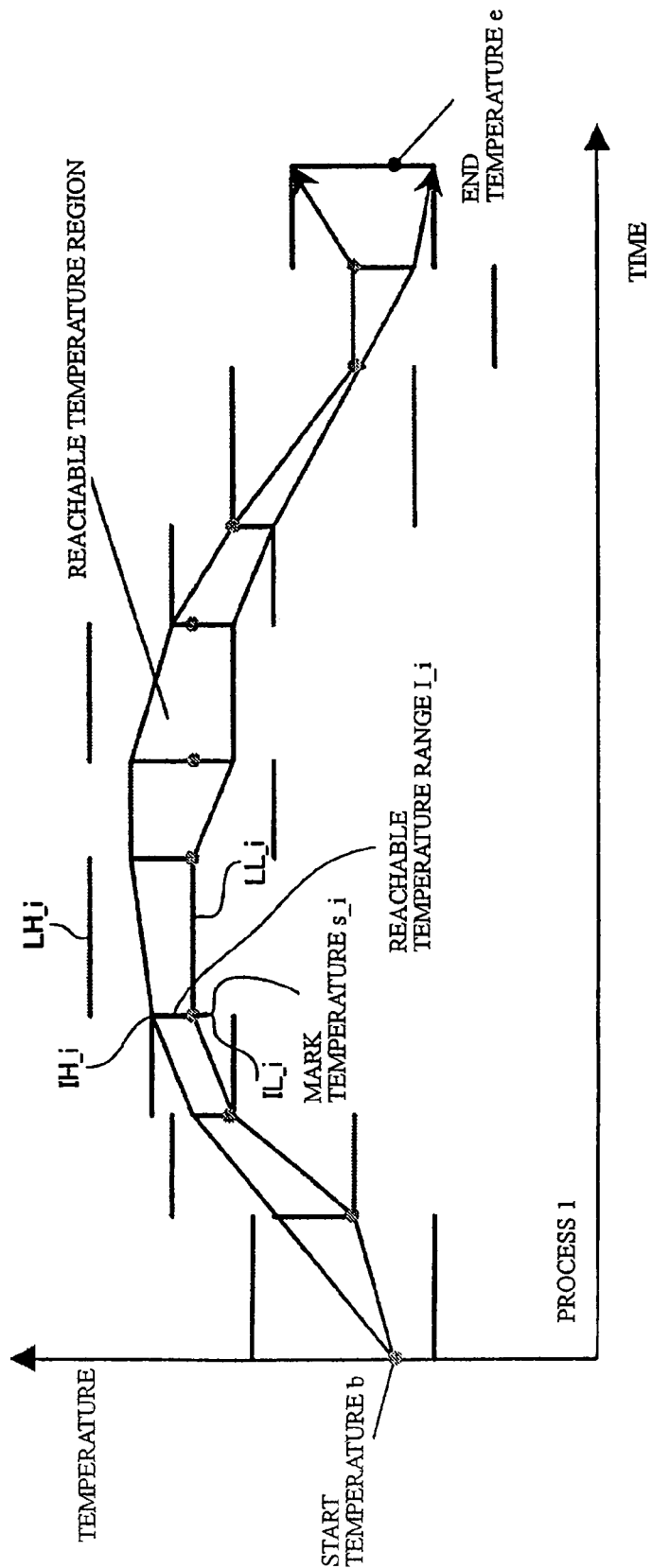

[Figure 4]
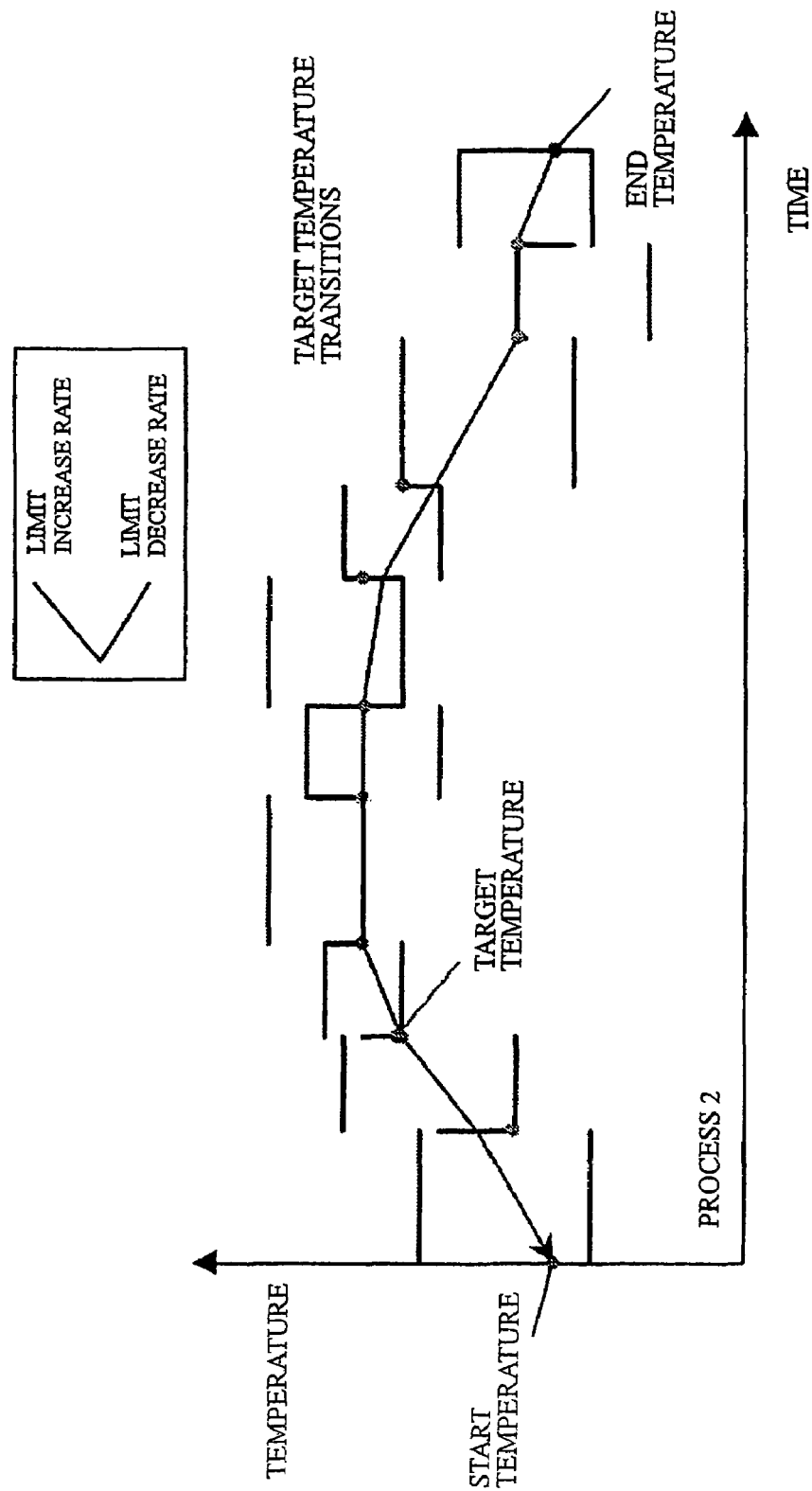

[Figure 5]
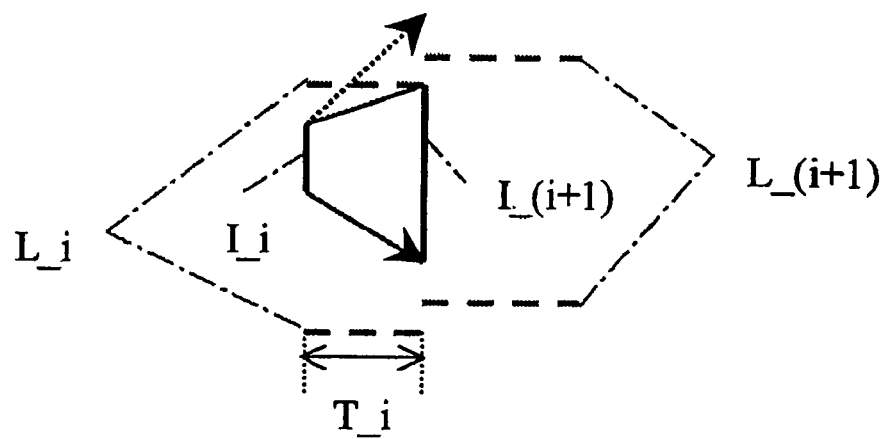
[Figure 6]
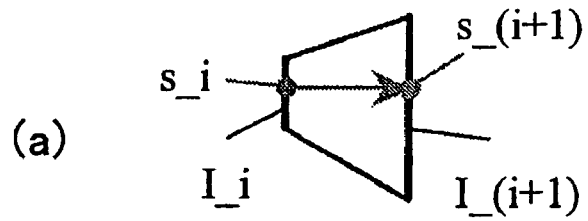
(a)
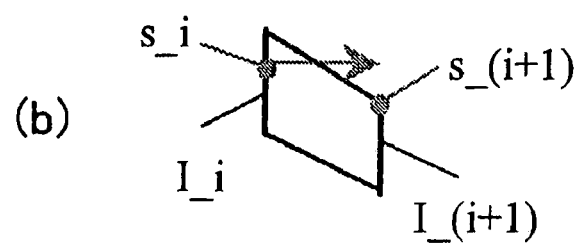
(b)

[Figure 7]
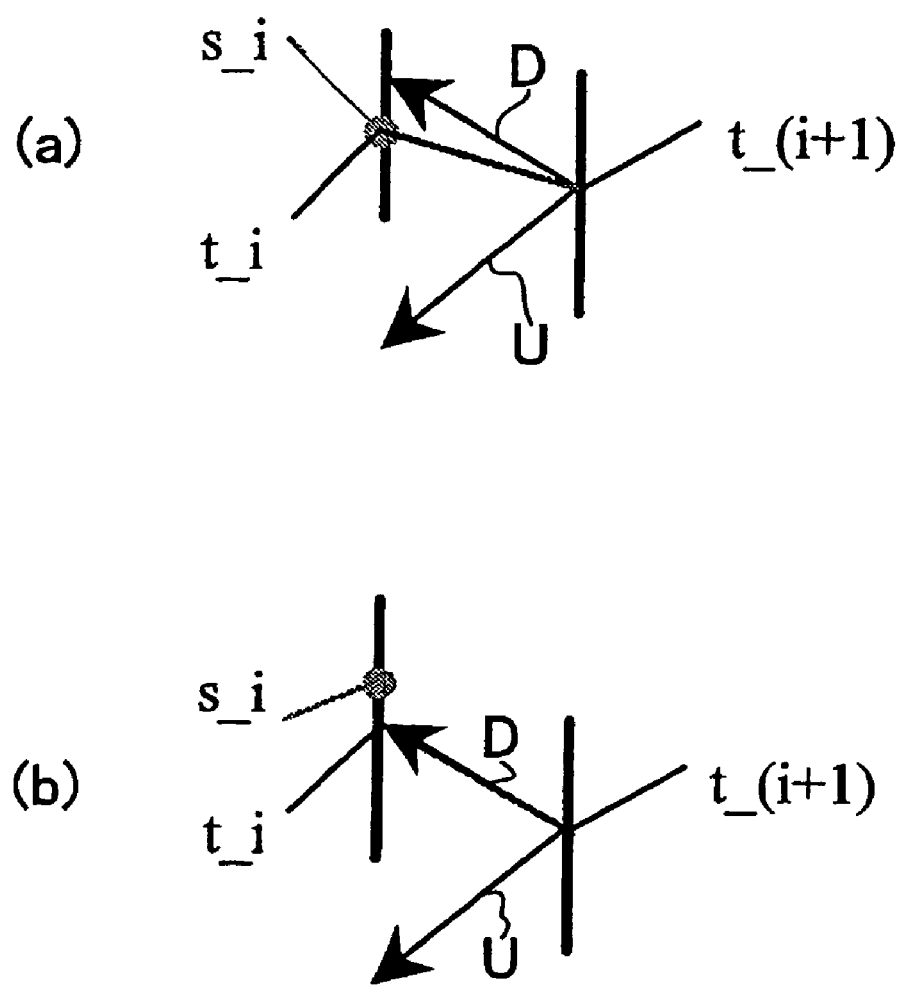

[Figure 8]
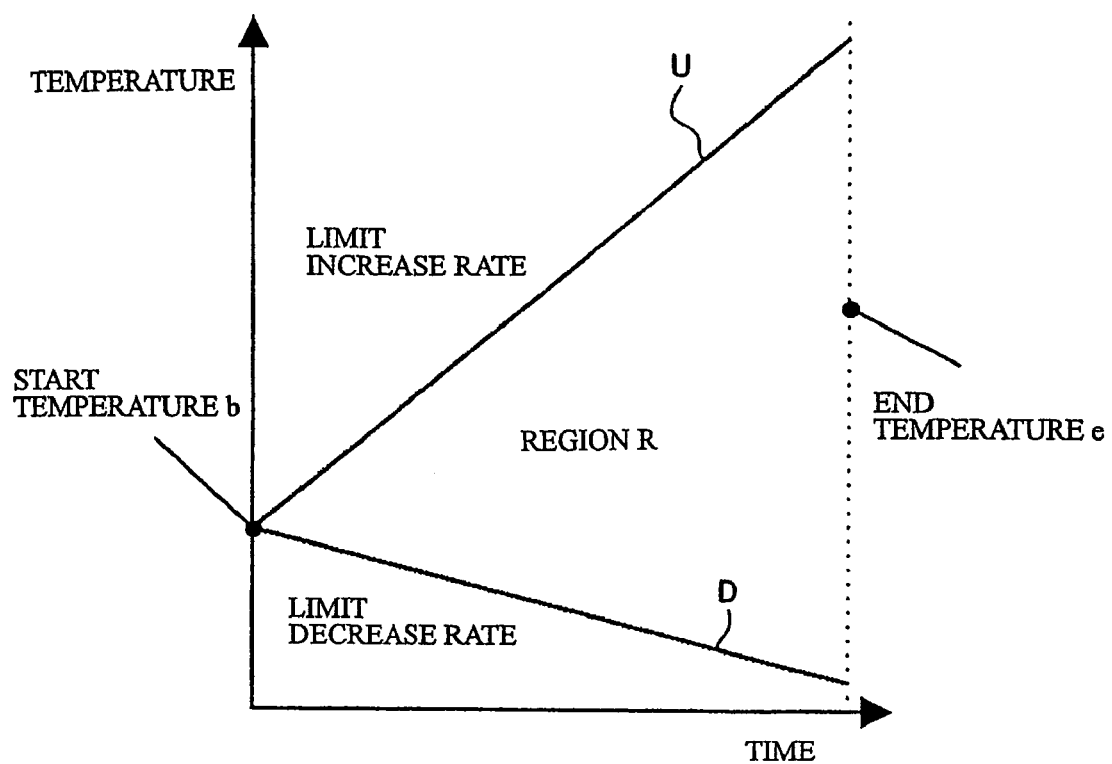

[Figure 9]
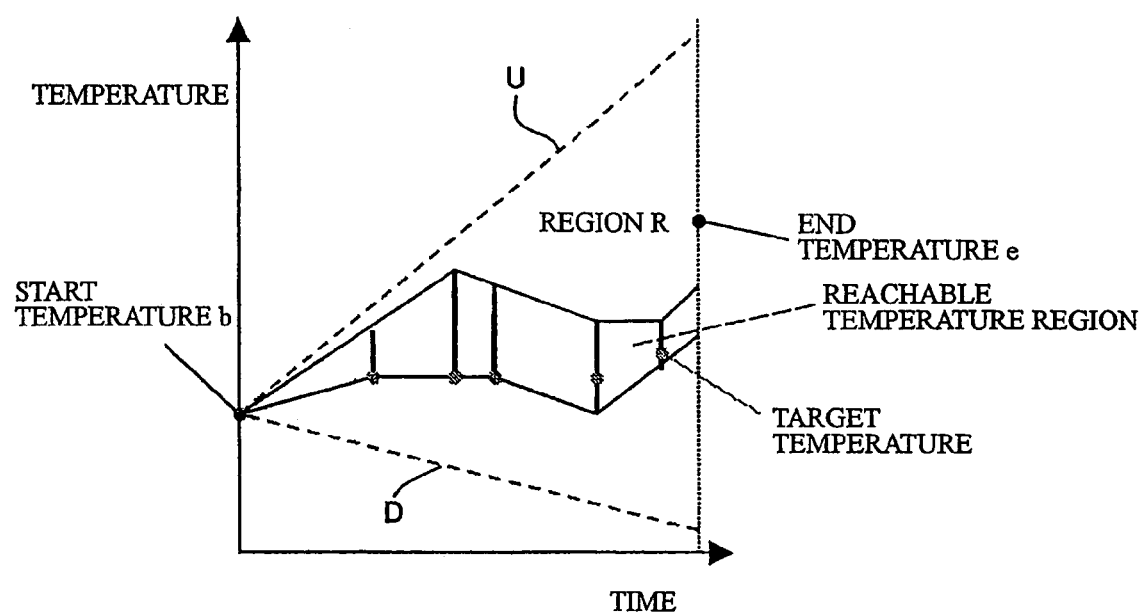

[Figure 10]
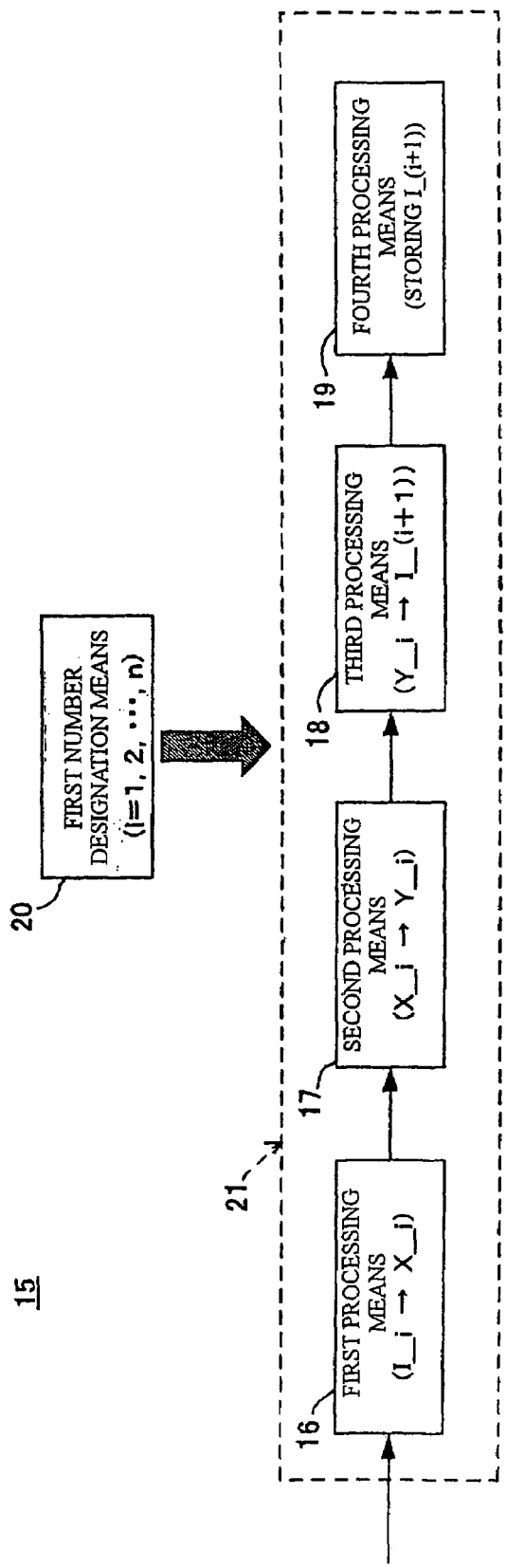

[Figure 11]
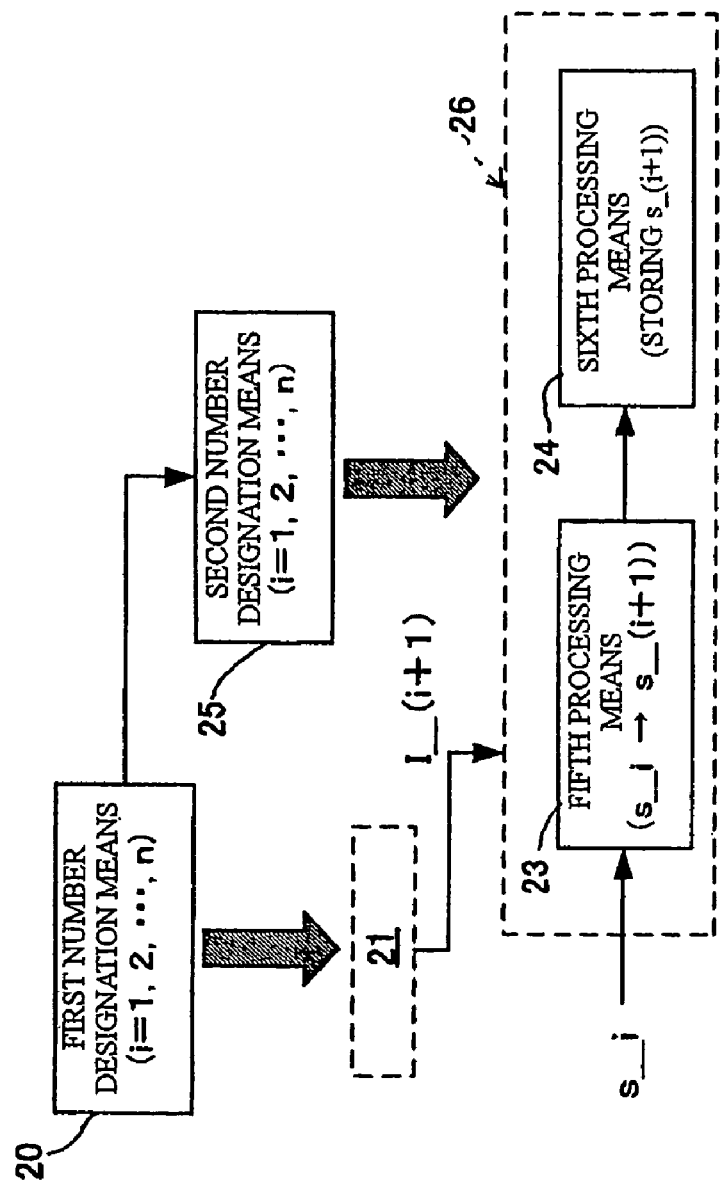

[Figure 12]
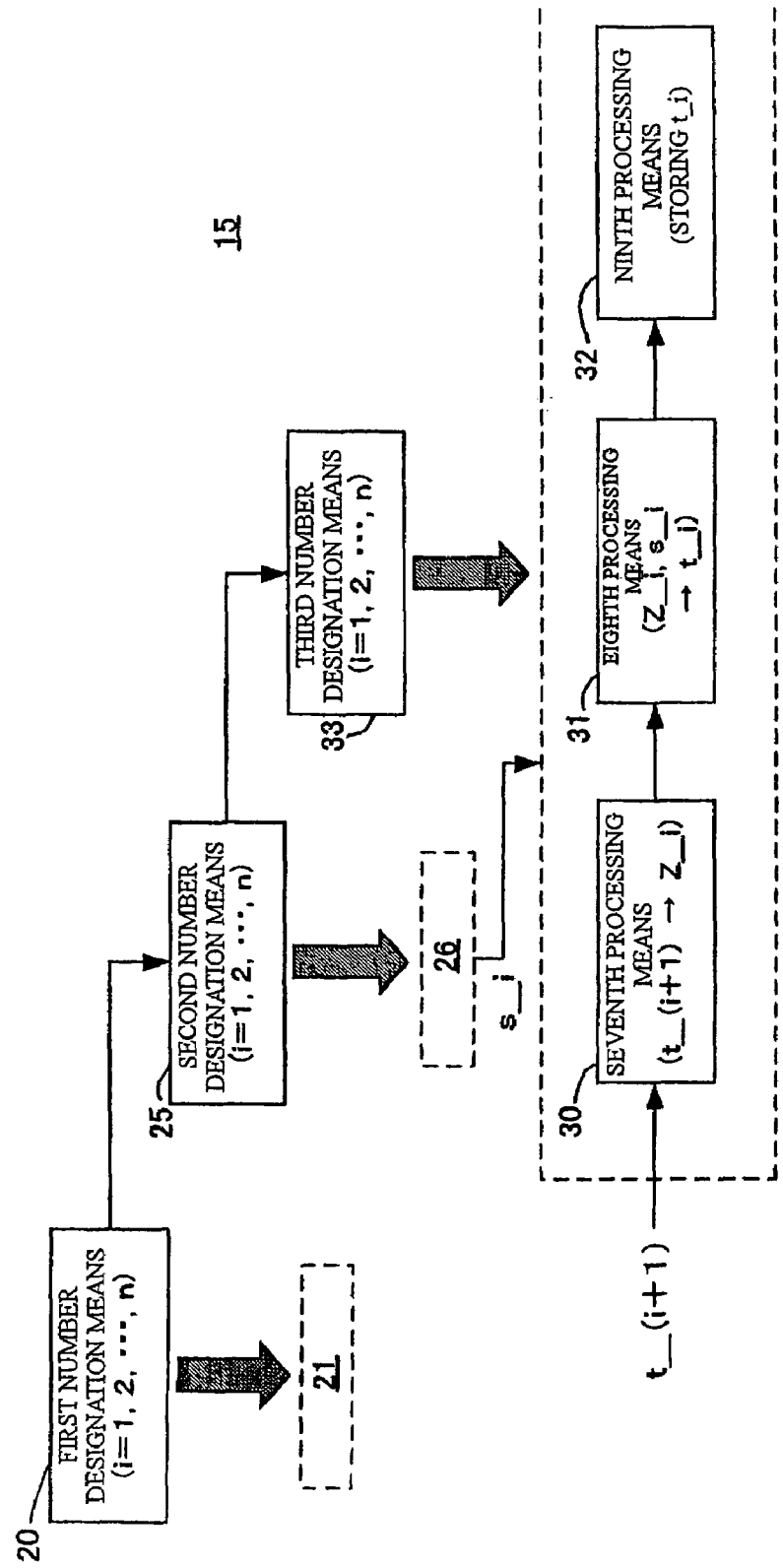

[Figure 13]
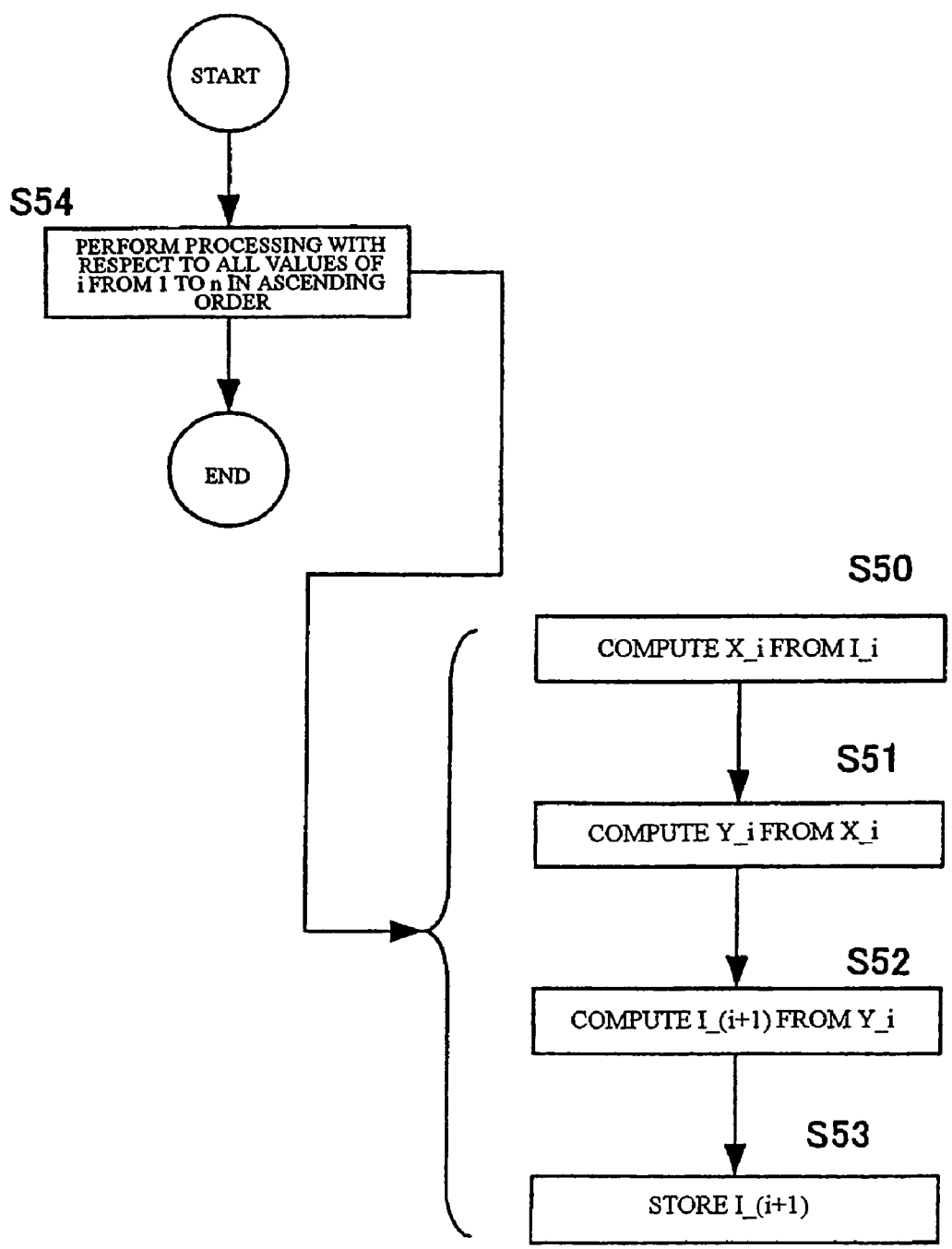

[Figure 14]
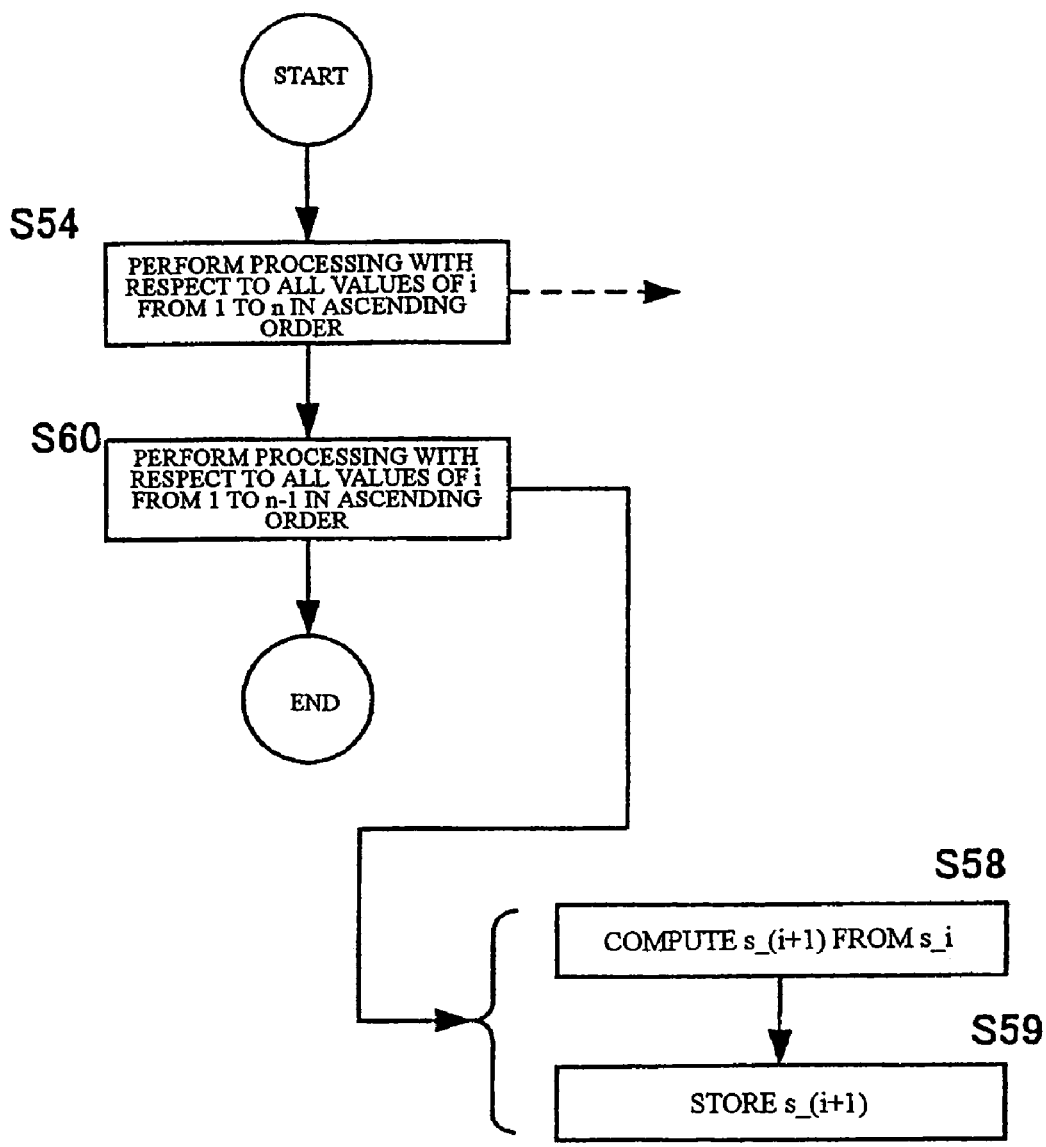

[Figure 15]
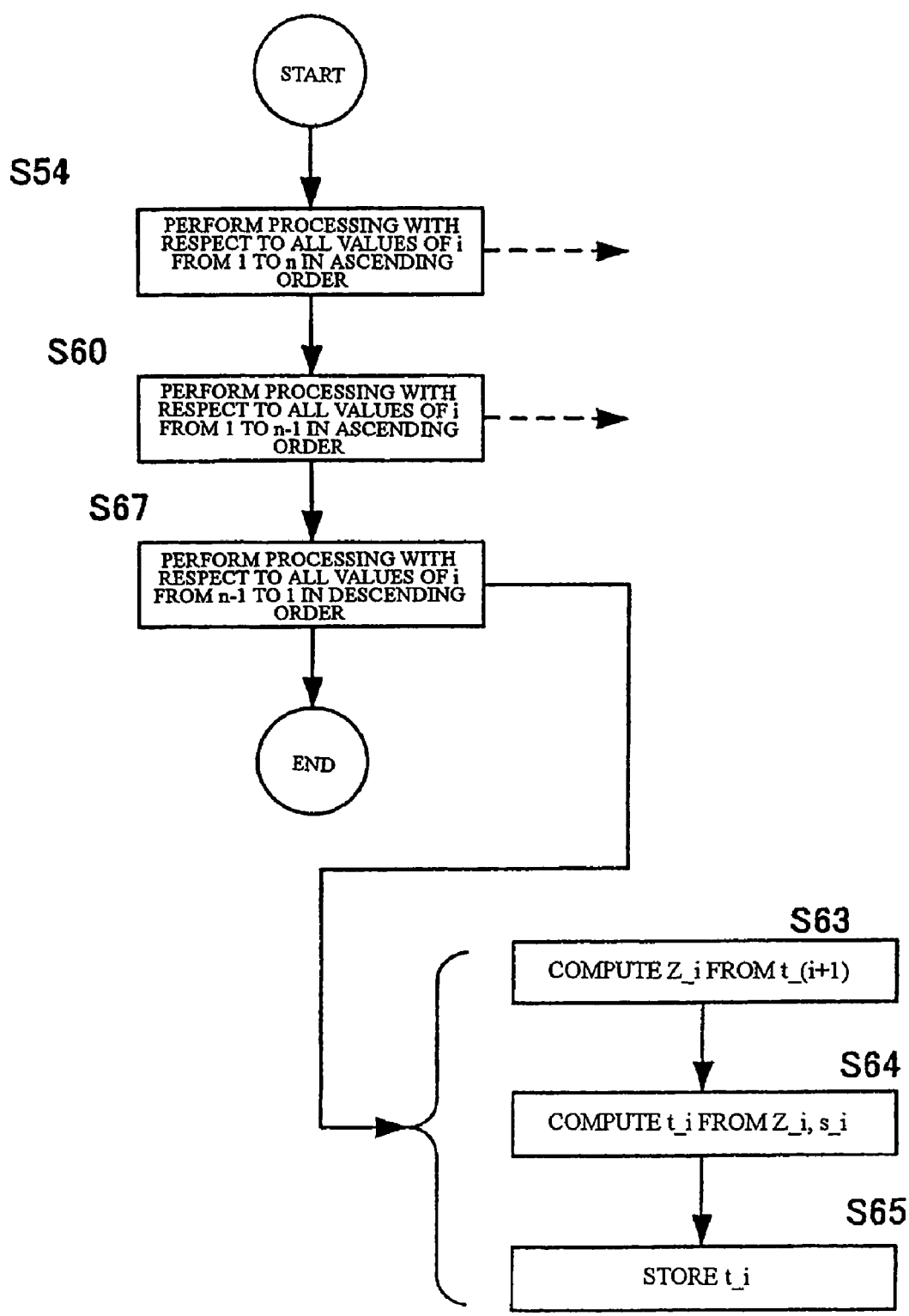

[Figure 16]
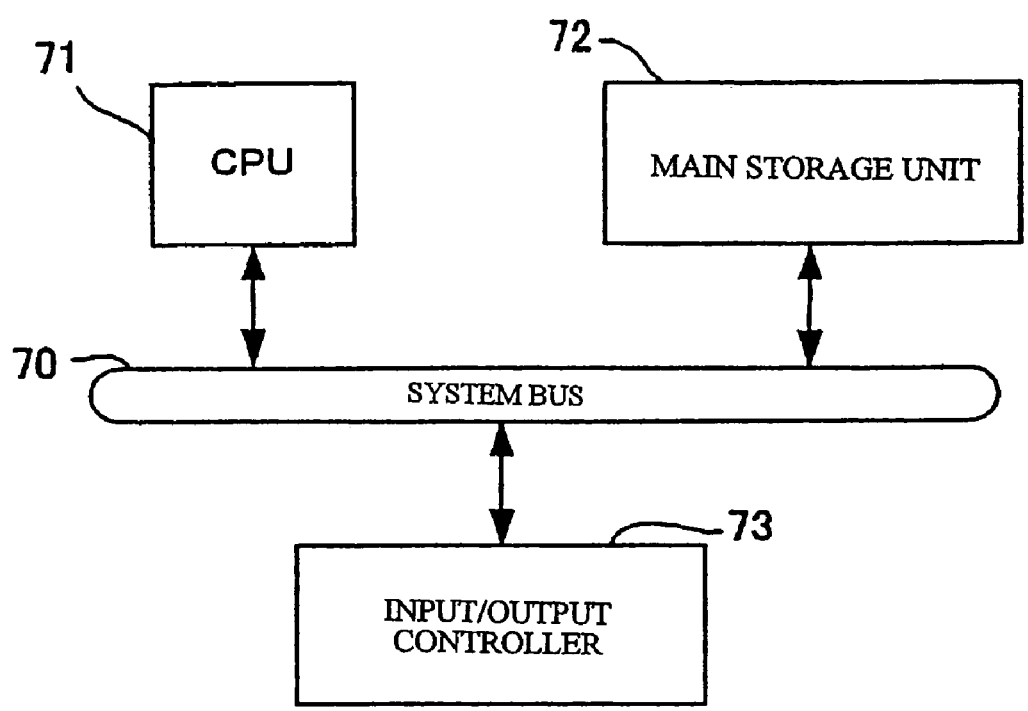

[Figure 17]
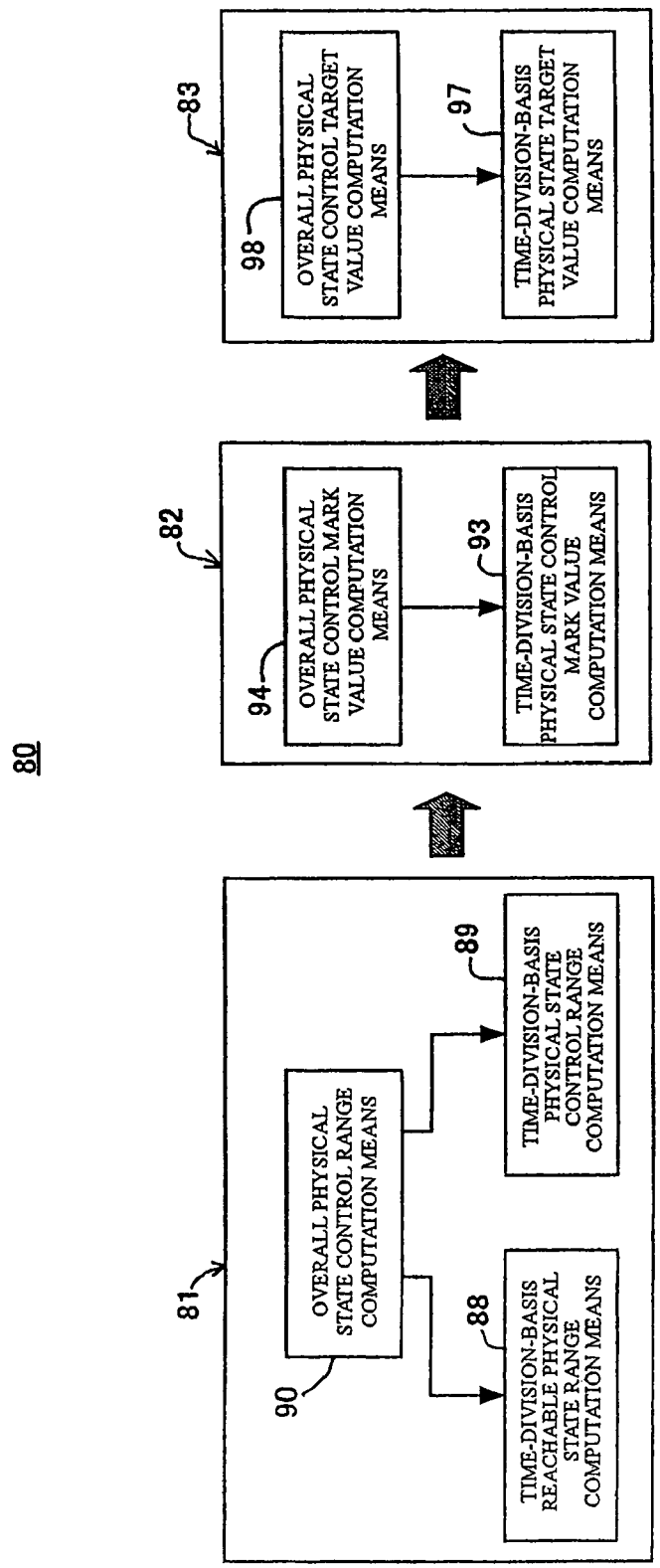

[Figure 18]
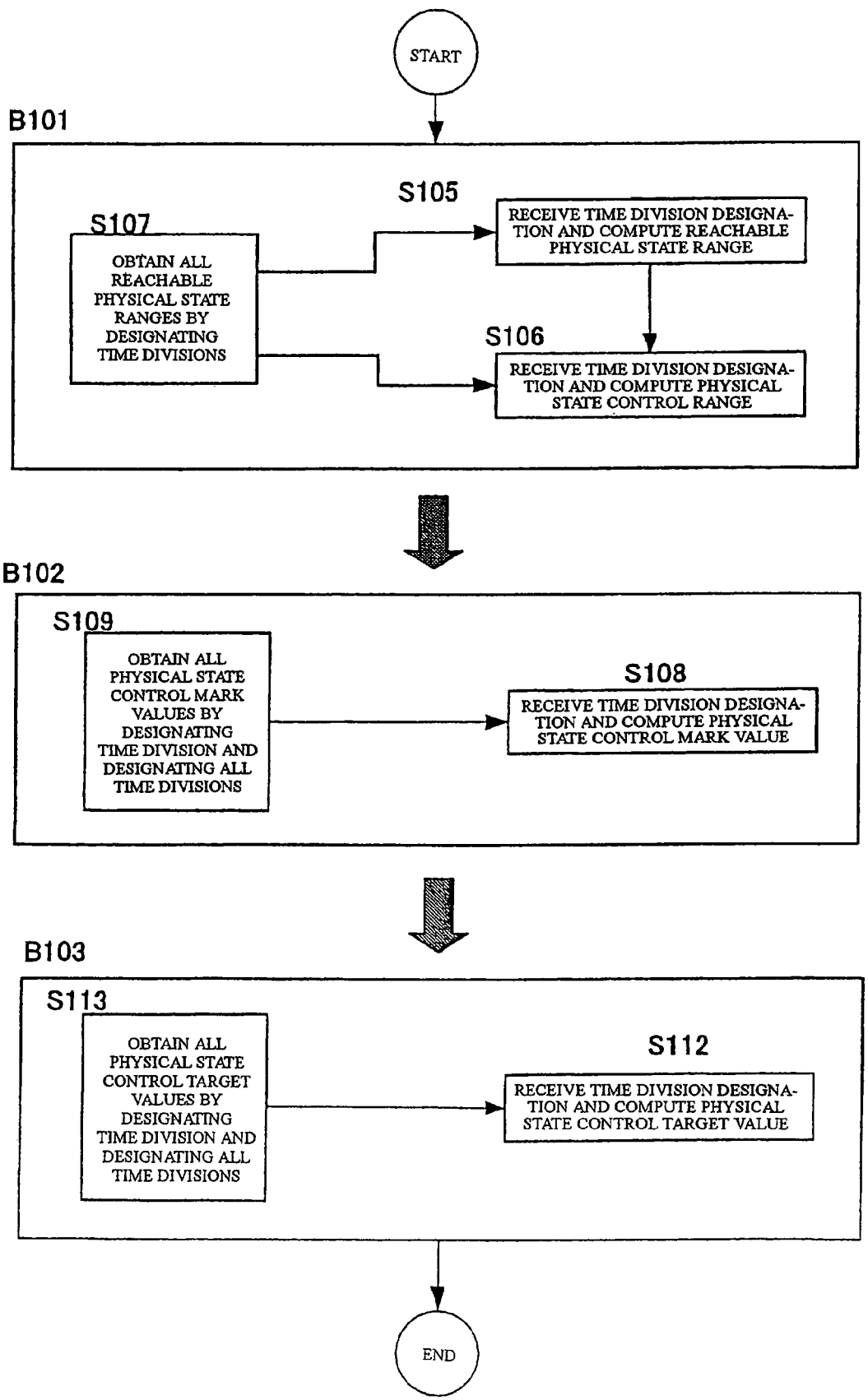

APPARATUS, METHOD AND PROGRAM FOR PHYSICAL STATE CONTROLLER

CROSS-REFERENCE TO RELATED APPLICATIONS

This application claims benefit of Japanese patent application serial number 2003-115246, filed Apr. 21, 2003, which is herein incorporated by reference.

BACKGROUND OF THE INVENTION

1. Field of the Invention

The present invention relates to a physical state control purpose information computation apparatus, a physical state control purpose information computation method, a physical state control purpose information computation program and a physical state controller for controlling a control-processing-object material with respect to a physical state of the material over a predetermined control time period under control conditions in consecutive time divisions into which the predetermined control time period is divided. Typically, the present invention relates to a physical state control purpose information computation apparatus, a physical state control purpose information computation method, a physical state control purpose information computation program and a physical state controller applied to a continuous annealing process in the steel industry.

Processes exist in which materials of different kinds are connected in series and the train of the materials is conveyed on a line to sequentially undergo heat treatment. Such processes are typified by a continuous annealing process in steel manufacture. Ordinarily, an allowable temperature range (upper limit, lower limit) and a processing time are determined with respect to each of different materials, and it is necessary for an apparatus for performing heat treatment to change controlled temperatures so that the temperature of each material is within the temperature range. The temperature increase and decrease rates in the apparatus are determined within certain limits.

In obtaining temperature transitions satisfying conditions according to temperature ranges with respect to materials, it is important to determine a suitable order (sequence) in which the materials are caused to flow on a line. To know whether temperature transitions satisfying conditions according to the temperature ranges can be made with respect to a sequence, it is necessary to evaluate the temperature transitions with respect to the sequence, that is, it is necessary to evaluate whether temperature transitions are possible such that no deviations from the temperature ranges occur (or what amount of deviation is allowable). Evaluations of temperature transitions thus obtained are reflected in total evaluations of sequences of materials (including evaluations of other restrictions) and used for the purpose of determining a suitable one of the sequences. Target temperature transitions finally obtained can be used as a temperature increasing and reducing schedule in the apparatus for heat treatment.

In conventional continuous annealing processes, finding a sequence capable of satisfying conditions according to certain temperature ranges has been intuitively performed by an expert (a master or a skilled person) on an empirical basis. A method of finding a suitable order of materials to be annealed, conventionally performed by experts, will be described concretely. For example, a displayable editable table is prepared on a screen of a PC (personal computer) by a spreadsheet program such as Excel (a registered trademark of Microsoft Corporation). In the table, materials to be annealed are related to rows (records) and the widths and thicknesses of the materials to be annealed, temperature range codes and other attribute items are related to columns (fields). The temperature range codes are numeric values, e.g., 75, 76, 86, 87, 88 . . . , and an expert grasps "75" as a temperature range [240° C.–280° C.] and "76" as a temperature range [260° C.–310° C.], for example. Also, the expert roughly grasps the degree of proximity between 75 and 76, between 86 and 87, and so on, and determines in his/her thought a sequence such that the adjacent temperature ranges overlap one another while considering other restrictions. In an ordinary steelwork, a plurality of lines (e.g., several ten lines) exist on which processes are simultaneously executed in parallel with each other, and an expert determines in which sequences on lines each of items to be annealed should be included. In the case where a need to produce an item at an urgent request arises and where the item at the urgent request is inserted in a predetermined line with priority, it is necessary to reconsider the sequence following the inserted article.

2. Description of the Related Art

Patent Document 1 discloses a batch annealing process with respect to a cast product. In the batch annealing process, a determination reference temperature transition curve is formed on the basis of an atmosphere temperature transition tendency according to an empirical rule with respect to a self-annealing box and atmosphere temperatures suitable for annealing, and actual atmosphere temperatures in the self-annealing box at a plurality of points in time in a self-annealing process are measured. The quality of annealing is determined by checking the measured temperatures against the determination reference temperature transition curve.

Published Unexamined Patent Application No. 11-291021 (Patent Document 1)

If temperature transitions satisfying conditions according to temperature ranges are possible, it is necessary to obtain such transitions (of a zero temperature deviation cost). However, if it is impossible to satisfy conditions according to the ranges, it is not necessary to obtain temperature transitions (of a minimum temperature deviation cost) by strict calculation. Finding temperature transitions satisfying conditions according to temperature ranges by changing the sequence is essentially preferable. Also, since there is a substantially high possibility of a schedule posterior with respect to time being changed afterward, it is sufficient in ordinary cases to satisfy temperature range conditions with respect to materials preceding in time with priority. With respect to items to be annealed, it is preferable to avoid changing the temperature during annealing from the viewpoint of maintaining the quality. Since there is a possibility of a sequence of materials coming after in time being changed, for example, due to occurrence of a need to process an additional item at an urgent request, it is desirable to avoid changing the temperature as long as a point in time at which it becomes impossible to satisfy temperature range conditions for items to be subsequently annealed in the order or to reach an end temperature is not reached.

In the conventional method of formation of a sequence by an expert, it is difficult for an expert to accurately determine, with respect to a sequence formed as an order of a plurality of materials to be presently annealed, whether temperature control of the entire sequence can be actually executed under temperature increase and decrease rate restrictions so as to satisfy temperature range conditions with respect to the materials to be annealed. Also, it is difficult to immediately predict when annealing on a material probable to come at a position closer to the end of an order of materials to be annealed will end.

Patent Document 1 does not present or suggest any algorithms for determination as to (a) whether, in a continuous annealing process, with respect to a sequence of steel sections in which steel sections to be annealed have different upper and lower limit temperatures in corresponding annealing periods, temperature control can be executed so as to satisfy conditions according to the upper and lower limit temperatures of each steel section to be annealed (hereinafter referred to simply as "temperature range conditions" as occasion demands), and (b), under a demand for minimizing variation in temperature in each steel section to be annealed, which is desirable from the viewpoint of improving the quality of the steel section to be annealed, how concrete controlled temperature transitions should be made with respect to the sequence of steel sections to be annealed to meet the demand while satisfying the temperature range conditions.

A process is conceivable in which a temperature transition cost is suitably defined with respect to the degree of deviation from a temperature range and temperature transitions of the lowest cost are obtained by a dynamic programming technique with respect to possible temperature ranges. To perform this process, however, there is a need to first discretize temperatures in ranges through which transitions can be made. This discretization is time-consuming and also entails a problem in terms of accuracy. If discretization is finely performed to obtain temperature values in wider ranges to improve the accuracy, the efficiency is reduced.

A first object of the present invention is to provide a physical state control purpose information computation apparatus, a physical state control purpose information computation method, a physical state control purpose information computation program and a physical state controller capable of efficiently executing processing for computation of information as to whether control of a physical state of a control-processing-object material satisfying physical state range conditions with respect to time divisions is actually possible in the case where a limit heightening rate and a limit lowering rate exist and where the physical state range condition is determined with respect to each time division in a control time period.

A second object of the present invention is to provide a physical state control purpose information computation apparatus, a physical state control purpose information computation method, a physical state control purpose information computation program and a physical state controller capable of efficiently computing a concrete process of transition of a physical state in which variation in the physical state in each of time divisions is limited, and also having the capability according to the first object.

A third object of the present invention is to provide a physical state control purpose information computation apparatus, a physical state control purpose information computation method, a physical state control purpose information computation program and a physical state controller capable of efficiently computing a concrete process of transition of a physical state such that physical states of a control-processing-object material at a beginning time and an ending time in a control time period coincide with a given value, and also having the capability according to the second object.

A fourth object of the present invention is to provide a physical state control purpose information computation apparatus, a physical state control purpose information computation method, a physical state control purpose information computation program and a physical state controller suitable for annealing of steel, and also having the capability according to the third object.

SUMMARY OF THE INVENTION

In a physical state controller using information computed by a first physical state control purpose information computation apparatus and method, a control time period of a finite length to be used is divided into a plurality of consecutive time divisions. The physical state controller controls a physical state of a control-processing-object material. A limited physical state range relating to the physical state of the control-processing-object material is set in each time division. The physical state controller changes the physical state of the control-processing-object material at a rate within the corresponding limit control rate range and simultaneously controls the physical state of the control-processing-object material so that the physical state of the control-processing-object material is within the limited physical state range in the time division.

The first physical state control purpose information computation apparatus of the present invention has the following means:

time-division-basis reachable physical state range computation means of computing a reachable physical state range reachable by the time the given time division ends on the basis of the physical state control range at the beginning of the given time division and the limit control rates of the physical state controller;

time-division-basis physical state control range computation means of computing a physical state control range at the beginning of the time division next to the given time division on the basis of the reachable physical state range at the end of the given time division and the limited physical state range in the next time division; and overall physical state control range computation means of designating the time divisions in order from the first time division to the last time division in the control time period and making each of the time-division-basis reachable physical state range computation means and the time-division-basis physical state control range computation means repeat executing its processing to obtain physical state control ranges at the beginnings of all the time divisions.

The first physical state control purpose information computation method of the present invention has the following steps:

a time-division-basis reachable physical state range computation step of computing a reachable physical state range reachable by the time the given time division ends on the basis of the physical state control range at the beginning of the given time division and the limit control rates of the physical state controller;

a time-division-basis physical state control range computation step of computing a physical state control range at the beginning of the time division next to the given time division on the basis of the reachable physical state range at the end of the given time division and the limited physical state range in the next time division; and an overall physical state control range computation step of designating the time divisions in order from the first time division to the last time division in the control time period and repeating executing each of the time-division-basis reachable physical state range computation step and the time-division-basis physical state control range computation step to obtain physical state control ranges at the beginnings of all the time divisions.

According to a second physical state control purpose information computation apparatus and method, information to be used by a physical state controller in which a control time period of a finite length being divided into a plurality of consecutive time divisions, and which controls a physical state of a control-processing-object material on the basis of conditions relating to the physical state of the control-processing-object material in each of the time divisions through the entire control time period is computed. Definitions shown below are given. Information about n, b, e, $LL\_i$, $LH\_i$, D, and U is given. Each index on the right-hand side of "_" represents a number.

(a1) n: the total number of time divisions constituting the control time period (a2) i: the number of each time division in the control time period when the time divisions are successively assigned numbers 1, 2, . . . , n in order from the first time division in time series (a3) b: the value of the physical state of the control-processing-object material at the beginning of the number-1 time division (a4) e: the value of the physical state of the control-processing-object material at the end of the number-n time division (a5) $LL\_i$: a lower limit value of the physical state of the control-processing-object material in the number-i time division (a6) $LH\_i$: an upper limit value of the physical state of the control-processing-object material in the number-i time division (a7) $L\_i=[LL\_i, LH\_i]$, $L\_(n+1)=[LL\_n, LH\_n]$ (a8) D: a limit heightening rate when the physical state of the control-processing-object material is heightened (a9) U: a limit lowering rate when the physical state of the control-processing-object material is lowered (a10) *: a multiplication operator (a11) $T\_i$: the length of the number-i time division (a12) $IL\_i$: a lower limit of the physical state of the control-processing-object material reachable by the time the number-i time division begins (a13) $IH\_i$: an upper limit of the physical state of the control-processing-object material reachable by the time the number-i time division begins (a14) $I\_i=[IL\_i, IH\_i]$, $I\_1=[b, b]=b$ (a15) $X\_i=[IL\_i-D*T\_i, IH\_i+U*T\_i]$ (a16) $Y\_i=X\_i \cap L\_i$ when $X\_i \cap L\_i \neq f$ (a17) $Y\_i=X\_i$ when $X\_i \cap L\_i=f$ (a18) $L\_(i+1)=Y\_i \cap L\_(i+1)$ when $Y\_i \cap L\_(i+1) \neq f$ (a19) $L\_(i+1)=Y\_i$ when $Y\_i \cap L\_(i+1)=f$.

A second physical state control purpose information computation apparatus of the present invention has the following means:

first processing means of computing $X\_i$ from $I\_i$ on the basis of the above (a15) with respect to a given i;

second processing means of computing $Y\_i$ on the basis of the result of computation by the first processing means and the above (a16) and (a17) with respect to the given i;

third processing means of computing $I\_(i+1)$ on the basis of the result of computation by the second processing means and the above (a18) and (a19) with respect to the given i;

fourth processing means of storing, as information, $I\_(i+1)$, i.e., the result of computation by the third processing means, with respect to the given i; and first number designation means of making each of the first to fourth processing means execute its processing with respect to the values of i in ascending order from i=1 to i=n.

A second physical state control purpose information computation method of the present invention has the following steps:

a first processing step of computing $X\_i$ from $I\_i$ on the basis of the above (a15) with respect to a given i;

a second processing step of computing $Y\_i$ on the basis of the result of computation in the first processing step and the above (a16) and (a17) with respect to the given i;

a third processing step of computing $I\_(i+1)$ on the basis of the result of computation in the second processing step and the above (a18) and (a19) with respect to the given i;

a fourth processing step of storing, as information, $I\_(i+1)$, i.e., the result of computation in the third processing step, with respect to the given i; and a first number designation step of executing each of the first to fourth processing steps with respect to the values of i in ascending order from i=1 to i=n.

Further definitions are given as shown below.

(b1) $s\_1=b$ (b2) $s\_(i+1)=s\_i$ when $s\_i \in L\_(i+1)$ (b3) $s\_(i+1)=IL\_(i+1)$ when $s\_i<IL\_(i+1)$ (b4) $s\_(i+1)=IH\_(i+1)$ when $s\_i>IH\_(i+1)$.

A third physical state control purpose information computation apparatus of the present invention has the same means as those of the second physical state control purpose information computation apparatus and the following other additional means:

fifth processing means of computing $s\_(i+1)$ on the basis of the above (b2) to (b4) with respect to the given i;

sixth processing means of storing, as information, $s\_(i+1)$, i.e., the result of computation by the fifth processing means, with respect to the given i; and second number designation means of making each of the fifth and sixth processing means execute its processing with respect to the values of i in ascending order from i=1 to i=n−1.

A third physical state control purpose information computation method of the present invention has the same steps as those of the second physical state control purpose information computation method and the following other additional steps:

a fifth processing step of computing $s\_(i+1)$ on the basis of the above (b2) to (b4) with respect to the given i;

a sixth processing step of storing, as information, $s\_(i+1)$, i.e., the result of computation in the fifth processing step, with respect to the given i; and a second number designation step of executing each of the fifth and sixth processing steps with respect to the values of i in ascending order from i=1 to i=n−1.

Further definitions are given as shown below.

(c1) $t\_(n+1)=e$, (c2) $Z\_i$ $(:=[ZL\_i, ZH\_i])=[t\_(i+1)-U*T\_i, t\_(i+1)+D*T\_i]$ (c3) $t\_i=s\_i$ when $s\_i \in Z\_i$ (c4) $t\_i=ZL\_i$ when $s\_i<ZL\_i$ (c5) $t\_i=ZH\_i$ when $s\_i>ZH\_i$.

A fourth physical state control purpose information computation apparatus of the present invention has the same means as those of the third physical state control purpose information computation apparatus and the following other additional means:

seventh processing means of computing Z_i from t_(i+1) on the basis of the above (c2) with respect to the given i;

eighth processing means of computing t_i on the basis of the result of computation by the seventh processing means and the above (c3) to (c5) with respect to the given i;

ninth processing means of storing, as information, t_i, i.e., the result of computation by the eighth processing means, with respect the given i; and third number designation means of making each of the seventh to ninth processing means execute its processing with respect to the values of i in descending order from i=n to i=1.

A fourth physical state control purpose information computation method of the present invention has the same steps as those of the third physical state control purpose information computation method and the following other additional steps:

a seventh processing step of computing Z_i from t_(i+1) on the basis of the above (c2) with respect to the given i;

an eighth processing step of computing t_i on the basis of the result of computation in the seventh processing step and the above (c3) to (c5) with respect to the given i;

a ninth processing step of storing, as information, t_i, i.e., the result of computation in the eighth processing step, with respect the given i; and a third number designation step of executing each of the seventh to ninth processing steps with respect to the values of i in descending order from i=n to i=1.

The second physical state control purpose information computation apparatus and method can be used in combination with a physical state control purpose information computation apparatus and method which are different from the second and fourth physical state control purpose information computation apparatuses and methods, and in which series s_i and series t_i are computed from series L_i.

The third physical state control purpose information computation apparatus and method can be used in combination with a physical state control purpose information computation apparatus and method which are different from the fourth physical state control purpose information computation apparatus and method, and in which series t_i is computed from series s_i.

After computation of series I_i, s_i, and t_i with respect to the entire control time period in which the n number of time divisions exist in numbered order has been completed by the first to fourth physical state control purpose information computation apparatuses and methods, control based on the computed values is started. When a control-processing-object material to be controlled with priority appears thereafter, control for inserting the control-processing-object material to be controlled with priority before the control-processing-object material to be next processed in the original schedule (assumed to have a number k+1) may be executed. When such insertion control is executed, the inserted control-processing-object material is assigned a number k; numbers k, k+1, . . . , n are changed into numbers 1, 2, . . . , n−k; n−k is newly set as n; and series I_i, s_i, and t_i are recomputed by the first to fourth physical state control purpose information computation apparatuses and methods.

To the above-described physical state control purpose information computation apparatus and method, one of items described below or a combination of any of the items described below may be added.

The control-processing-object material is one of a solid, a liquid and a gas, or a combination of any of the solid, liquid and gas.

The physical state is a dynamic state, an optical state, a thermodynamic state (including a temperature state) or an electromagnetic state.

The control-processing-object material is a metal and the physical state is temperature.

The metal is steel to be annealed. The steel to be annealed is formed as a continuous member in which a plurality of lengthwise sections having different annealing temperature upper and lower limits are connected in series in the direction of movement, which is moved at a constant speed, and which undergoes annealing at a predetermined position in the direction of movement. LH_i and LL_i correspond to the upper limit temperature and the lower limit temperature in annealing on the number-i lengthwise section of the continuous member.

A physical state control purpose information computation program of the present invention makes a computer function as each of the means in one of the above-described physical state control purpose information computation apparatuses, or a physical state control purpose information computation program of the present invention makes a computer execute each of the steps in one of the above-described physical state control purpose information computation methods.

A physical state controller of the present invention controls a physical state of a control-processing-object material on the basis of physical state control ranges, I_i, s_i and/or t_i computed by one of the above-described physical state control purpose information computation apparatuses, I_i, s_i and/or t_i corresponding to time divisions i.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a diagram schematically, showing a steel-manufacturing annealing apparatus;

FIG. 2 is a diagram showing temperature ranges in time divisions on a temperature control schedule executed on an annealing object steel band in the steel-manufacturing annealing apparatus shown in FIG. 1;

FIG. 3 is a diagram showing reachable temperature regions obtained by using Process 1 with respect to the temperature restrictions shown in FIG. 2;

FIG. 4 is a diagram showing transitions of target temperature t_i based on Process 2;

FIG. 5 is a diagram schematically showing the relationship between restriction temperatures [LL_i, LH_i] and reachable temperatures I_i in the time divisions corresponding to the annealing object steel band;

FIG. 6 is a diagram showing the relationship between reachable temperatures I_i and mark temperatures s_i;

FIG. 7 is a diagram showing the relationship between limit rates U and D, mark temperature s_i and target temperature t_i;

FIG. 8 is a diagram for explaining the assumption that the difference is not large;

FIG. 9 is a diagram for explaining the relationship between a region R and a reachable temperature regions;

FIG. 10 is a functional block diagram of a physical state control purpose information computation apparatus;

FIG. 11 is a functional block diagram of a physical state control purpose information computation apparatus having additional functions in comparison with the physical state control purpose information computation apparatus shown in FIG. 10;

FIG. 12 is a functional block diagram of a physical state control purpose information computation apparatus having additional functions in comparison with the physical state control purpose information computation apparatus shown in FIG. 11;

FIG. 13 is a flowchart of a physical state control purpose information computation method;

FIG. 14 is a flowchart of a physical state control purpose information computation method having additional processing in comparison with the physical state control purpose information computation method shown in FIG. 13;

FIG. 15 is a flowchart of a physical state control purpose information computation method having additional processing in comparison with the physical state control purpose information computation method shown in FIG. 14;

FIG. 16 is a diagram of the configuration of hardware for executing a program;

FIG. 17 is a functional block diagram of another physical state control purpose information computation apparatus; and FIG. 18 is a flowchart of another physical state control purpose information computation method.

DETAILED DESCRIPTION

The present invention will be described concretely with respect to a mode of implementation and an embodiment thereof. Needless to say, the present invention is not limited to the mode of implementation and embodiment, and various changes in the described invention may be made without departing from the gist of the invention.

Various symbols used for description are first defined. Information about n, b, e, LL_i, LH_i, D, and U are given. Each index on the right-hand side of "_" represents a number. Symbol f represents an empty set. A control time period of a finite length is divided into a plurality-of consecutive time divisions, and a physical state of a control-processing-object material is controlled on the basis of conditions relating to the physical state of the control-processing-object material in each of the time divisions through the entire control time period.

(a1) n: the total number of time divisions constituting a control time period (a2) i: the number of each time division in the control time period when the time divisions are successively assigned numbers 1, 2, . . . , n in order from the first time division in time series (a3) b: the value of the physical state of the control-processing-object material at the beginning of the number-1 time division (a4) e: the value of the physical state of the control-processing-object material at the end of the number-n time division (a5) LL_i: a lower limit value of the physical state of the control-processing-object material in the number-i time division (a6) LH_i: an upper limit value of the physical state of the control-processing-object material in the number-i time division (a7) L_i=[LL_i, LH_i], L_(n+1)=[LL_n, LH_n]

(a8) D: a limit heightening rate when the physical state of the control-processing-object material is heightened (a9) U: a limit lowering rate when the physical state of the control-processing-object material is lowered (a10) *: a multiplication operator (a11) T_i: the length of the number-i time division (a12) IL_i: a lower limit of the physical state of the control-processing-object material reachable by the time the number-i time division begins (a13) IH_i: an upper limit of the physical state of the control-processing-object material reachable by the time the number-i time division begins (a14) I_i=[LL_i, IH_i], I_1=[b, b]=b (a15) X_i=[IL_i−D*T_i, IH_i+U*T_i]

(a16) Y_i=X_i∩L_i when X_i∩L_i¹f (a17) Y_i=X_i when X_i∩L_i=f (a18) I_(i+1)=Y_i∩L_(i+1) when Y_i∩L_(i+1)¹f (a19) I_(i+1)=Y_i when Y_i∩L_(i+1)=f (b1) s__1=b (b2) s_(i+1)=s_i when s_i∈I_(i+1)

(b3) s_(i+1)=IL_(i+1) when s_i<IL_(i+1)

(b4) s_(i+1)=IH_(i+1) when s_i>IH_(i+1)

(c1) t_(n+1)=e (c2) Z_i (:=[ZL_i, ZH_i])=[t_(i+1)−U*T_i, t_(i+1)+D*T_i]

(c3) t_i=s_i when s_i∈Z_i (c4) t_i=ZL_i when s_i<ZL_i (c5) t_i=ZH_i when s_i>ZH_i FIG. 1 is a diagram schematically showing a steel-manufacturing annealing apparatus 10. The steel-manufacturing annealing apparatus 10 is an example of application of the physical state control purpose information computation apparatus of the present invention to annealing in steel manufacture. The steel-manufacturing annealing apparatus 10 includes a temperature control apparatus 11 of a tunnel structure. Annealing object steel band 12 is a lengthwise band-like member extending in the direction of movement indicated by the arrow in FIG. 1. The annealing object steel band 12 moves at a constant speed v in the direction of the arrow, enters the temperature control apparatus 11 through an inlet 13, and exits from the temperature control apparatus 11 through an outlet 14. The annealing object steel band 12 is formed of a train of a plurality of different kinds of annealing object steel band sections in which each adjacent pair of sections is connected in the direction of movement by welding. The annealing object steel band 12 typically has a thickness of 0.1 mm and a width of 1 m. The temperature control apparatus 11 is controlled so that the atmosphere temperature at a predetermined position in the direction of movement of the annealing object steel band 12, typically the atmosphere temperature at the outlet 14 is within temperature ranges corresponding to the annealing object steel band sections which pass through the apparatus 11.

In the steel-manufacturing annealing apparatus 10, the above-described n, b, e, LL_i, D and U are defined by limiting their concepts as described below. The annealing object steel band 12 is assumed to be an annealing object steel band of a finite length on which temperature control scheduling is to be presently performed. The annealing object steel band sections constituting the annealing object steel band 12 are successively assigned numbers 1, 2, . . . from the one coming first in the direction of movement. The annealing object steel band 12 has annealing object steel band sections m__1, m__2, . . . in the order from the one coming first in the direction of movement. If the length of the annealing object steel band section m_i is R_i, R_i=v× T_i since the annealing object steel band 12 is moved at a constant speed v.

n: the total number of annealing object steel band sections in the annealing object steel band 12 b: the temperature at the time when control on the annealing object steel band 12 is started e: the temperature at the time when control on the annealing object steel band 12 ends LL_i: an upper limit temperature in temperature control on the ith annealing object steel band section LH_i: a lower limit temperature in temperature control on the ith annealing object steel band section D: a limit temperature increase rate in temperature control on the annealing object steel band 12

U: a limit temperature decrease rate in temperature control on the annealing object steel band 12

Restrictions in the case of application of the present invention to temperature control on the annealing object steel band 12 in which a predetermined number, n, of annealing object steel sections are successively arranged in a row are as described below. A series of target temperatures t_i described below with reference to FIG. 4 as a series of temperatures in the case of application of the present invention to temperature control on the annealing object steel band 12 satisfies the following restrictions.

(1) It is required that controlled temperature transitions be made within the range between the limit increase rate U and the limit decrease rate D.

(2) It is required that the controlled temperature start and end values b and e be linked. (It is assumed that the difference between b and e is not so large that b and e cannot be linked by limit rates U and D.)

(3) It is required that the controlled temperature with respect to each annealing object steel section be maintained within the range between the upper and lower limits with front priority as unfailingly as possible except when conformance to the restrictions (1) and (2) is made impossible.

(4) It is required that controlled temperature transitions be fixed as uniformly as possible except when conformance to the restrictions (1) to (3) is made impossible.

The reason for front priority in (3) is that the possibility of a sequence relating to a posterior part of a schedule being changed by insertion of an annealing object steel section at an urgent request is high at the time of actual control according to the posterior part, and that importance is therefore attached to a schedule part closer to the present time.

FIG. 2 shows temperature ranges (also called temperature restrictions) in time divisions on a temperature control scheduling executed on the annealing object steel band 12 in the steel-manufacturing annealing apparatus 10 shown in FIG. 1. The temperature control apparatus 11 has n number of annealing object steel band sections m_1, m_2, . . . , m_i, . . . , m_n connected in series in the direction of movement. Referring to FIG. 2, since the annealing object steel band 12 is passed through the temperature control apparatus 11 at the constant speed v, the time T_1, T_2, . . . , T_i, . . . , T_n required to pass each of the annealing object steel band sections m_1, m_2, . . . , m_i, . . . , m_n through a predetermined portion, e.g., the outlet 14 of the temperature control apparatus 11 is proportional to the length R_1, R_2, . . . R_i, . . . , R_n of the annealing object steel band section in the direction of movement. The temperature control apparatus 11 performs temperature control on each annealing object steel band section so that the atmosphere temperature at a predetermined portion, e.g., the outlet 14 of the temperature control apparatus 11 is within the temperature range L_i=[LL_i, LH_i] corresponding to the annealing object steel band section. That is, each annealing object steel band section m_i is not subjected to the atmosphere temperature in the temperature range L_i=[LL_i, LH_i] corresponding to it when it enters the inlet 13, but the atmosphere is controlled by the temperature control apparatus 11 so that the atmosphere temperature is in the temperature range L_i=[LL_i, LH_i] before or when the annealing object steel band section reaches the outlet 14. In a typical example of numeric values in the schedule shown in FIG. 2, the time period from the start to the end of temperature control is about one month; the annealing temperature is about 400 to 600° C.; the temperature range L_i is 50° C.; and one time division T_i is about several ten minutes.

A method of determining mark temperatures (series s_i will be referred to as "mark temperatures") in the steel-manufacturing annealing apparatus 10 can be roughly divided into two processes described below. If temperatures to be given to the annealing object steel band 12 by the temperature control apparatus 11 to enable the annealing object steel band 12 to be suitably annealed are referred to as "target temperatures", mark temperatures are considered intermediate data for obtaining target temperatures.

Process 1: Computation of reachable temperature regions (top® end)

Process 2: Computation of mark temperatures through the regions in Process 1 (end® top)

In Processes 1 and 2, a series of mark temperatures s_i and a series of target temperatures t_i are respectively computed. Series s_i is computed by considering the above-described restrictions (1), (3) and (4) in the case of application of the present invention to temperature control on the annealing object steel band 12, and series t_i is computed by considering the restrictions (1), (2) and (4).

In Process 1, the ranges of temperatures reachable by temperature transitions are successively obtained from the top to the end of the sequence starting from a start temperature while satisfying the restriction on the limit transition rates U and D. In the restrictions on the ranges of temperatures of the annealing object steel band sections, the restrictions on a front portion of the sequence are obtained with priority without considering the restrictions on a rear portion of the sequence. A region surrounded by lines each connecting two of the upper and lower limits of each adjacent pair of the reachable temperature ranges is referred to as a reachable temperature region. FIG. 3 shows reachable temperature regions obtained by using Process 1 with respect to the temperature restrictions shown in FIG. 2. In Process 1, mark temperatures s_i representing temperatures in the reachable ranges to which transitions of the temperatures of the annealing object steel band sections should be made are recorded to enable small-variation temperature transitions to be obtained in Process 2. A concrete example of the method of computing mark temperatures s_i will be described below.

In Process 2, target temperatures t_i are successively obtained from the end (i=n) to the top (i=1) of the sequence starting from the end temperature e while satisfying the restriction on the limit transition rates U and D. The target temperatures t_i aim to follow the mark temperatures s_i obtained in Process 1. If the reachable range l_i in Process 1 does not deviate from the temperature range L_i and if it finally includes the end temperature e, transitions satisfying the condition according to the temperature range L_i can be made in the sequence. In Process 2, in this case, no deviation of temperature transition from each reachable range occurs and, therefore, it is ensured that temperature transitions satisfying the temperature range conditions can be obtained. FIG. 4 shows transitions of target temperatures t_i on the basis of Process 2.

FIG. 5 schematically shows the relationship between restriction temperatures [LL_i, LH_i] and reachable temperatures I_i in the time divisions corresponding to the annealing object steel band. Reachable temperatures I_i are computed on the basis of equations (a15) to (a19) from i=1 to i=n in ascending order. From the condition (a3), I_1 (=[IL_1, IH_1])=b.

FIG. 6 shows the relationship between reachable temperatures I_i and mark temperatures s_i. Mark temperatures s_i are computed on the basis of equations (b2) to (b4) from i=1 to i=n in ascending order. FIG. 6(a) shows the relationship in the case of (b2), and FIG. 6(b) shows the relationship in the case of (b3) or (b4).

In Process 2, target temperatures t_i are obtained from the end to the top, i.e., from i=n to i=1 in descending order starting from the end temperature e, so as to follow the target temperatures obtained in Process 1 while satisfying the restriction on the limit transition rates. FIG. 7 shows the relationship between the limit rates U and D, mark temperature s_i and target temperature t_i. FIG. 7(a) shows the relationship in the case of (c3), and FIG. 7(b) shows the relationship in the case of (c4) or (c5). If the difference between the end temperature and the start temperature is so large that they cannot be linked even by a straight line having gradients corresponding to the limit (U, D) of the temperature transition rate (the meaning of this condition will be described below in detail with reference to FIGS. 8 and 9), the target temperature t_1 is not linked to the start temperature b. However, it is assumed that the end temperature and the start temperature do not differ so largely. The target temperature approaches the reachable temperature region from the end temperature at the limit rate. After entering the region, it links with the start temperature without deviating out of the region. If the end temperature e is included in the reachable region (that is, e∈I_(n+1)), and if all the temperature reachable ranges are within the temperature ranges (that is, oei: I_i⊆L_i), temperature transitions satisfying the temperature range conditions can be made. From the way of setting the target temperature, it can be understood that transitions of the temperature are made as uniform as possible and that when the temperature is changed, it is changed at a rate set to the temperature transition limit rate as closely as possible. As processing influencing the efficiency of computation, loop processing is performed only a number of times twice the number n of the annealing object steel band sections (n times in Process 1, and n times in Process 2).

It will be proved from FIGS. 8 and 9 that t_1 computed on the basis of (c1) to (c5) is t_1=b. FIG. 8 is a diagram for explaining the assumption that the difference between the start temperature b and the end temperature e is not so large that the start temperature b and the end temperature e cannot be linearly linked at a limit increase/decrease rate. That is, when two straight lines having gradients corresponding to the temperature limit increase rate U and the temperature limit decrease rate D are drawn from b, e is contained in the region between the two lines (hereinafter referred to as "region R").

FIG. 9 is a diagram for explaining the relationship between the region R and the reachable temperature regions. It is apparent that the region R contains the reachable temperature regions. All target temperatures s_i are contained in the reachable temperature regions, and are necessarily contained in the region R. Referring to the equations for computation of target temperatures t_i, it can be understood that if both t_(i+1) and s_i are contained in the region R, t_i is also contained in the region R. All of s_1=b, s_1, s_2, ..., s_n are contained in the region R. t_(n+1)=e is contained in the region R. It is shown by induction that all of t_n, t_(n−1), ..., t_2, t_1 are contained in the region R. Since the region R at the time of starting is one point b, t_1=b.

FIG. 10 is a functional block diagram of a physical state control purpose information computation apparatus 15. The same definitions as (a1) to (a19) described above are given. The physical state control purpose information computation apparatus 15, is not limited to the steel-manufacturing annealing apparatus 10. That is, a material on which the physical state control purpose information computation apparatus 15 performs physical state control may be, for example, one of a solid, a liquid and a gas, or a combination of any of the solid, liquid and gas as well as the annealing object steel band 12. The physical state is, for example, a dynamic state, an optical state, a thermodynamic state (comprising a temperature state), or an electromagnetic state.

In the physical state control purpose information computation apparatus 15 shown in FIG. 10, a first processing means 16 computes X_i from I_i on the basis of (a15) with respect to the given i. A second processing means 17 computes Y_i on the basis of the result of computation by the first processing means 16 and (a16) and (a17) with respect to the given i. A third processing means 18 computes I_(i+1) on the basis of the result of computation by the second processing means 17 and (a18) and (a19) with respect to the given i. A fourth processing means 19 stores, as information, I_(i+1), i.e., the result of computation by the third processing means 18, with respect to the given i. A first number designation means 20 makes each of the first to fourth processing means 16 to 19 execute its processing with respect to the values of i in ascending order from i=1 to i=n. The first to fourth processing means 16 to 19 as a whole constitute an instruction receiving means 21 for receiving instructions from the first number designation means 20.

FIG. 11 is a functional block diagram of another physical state control purpose information computation apparatus 15 having the same functions as those of the physical state control purpose information computation apparatus 15 shown in FIG. 10, and other additional functions. The same definitions as (b1) to (b4) described above are given. A fifth processing means 23 computes s_(i+1) on the basis of (b2) to (b4). The fifth processing means 23 computes s_(i+1) on the basis of (b2) to (b4) with respect to the given i. A sixth processing means 24 stores, as information, s_(i+1), i.e., the result of computation by the fifth processing means 23, with respect to the given i. A second number designation means 25 makes each of the fifth and sixth processing means 23 and 24 execute its processing with respect to the values of i in ascending order from i=1 to i=n−1. The fifth and sixth processing means 23 and 24 as a whole constitute an instruction receiving means 26 for receiving instructions from the second number designation means 25.

FIG. 12 is a functional block diagram of another physical state control purpose information computation apparatus 15 having the same functions as those of the physical state control purpose information computation apparatus 15 shown in FIG. 11, and other additional functions. The same definitions as (c1) to (c5) described above are given. A seventh processing means 30 computes Z_i from t_(i+1) on the basis of (c2). An eighth processing means 31 computes t_i from Z_i and s_i on the basis of (c3) to (c5). A ninth processing means 32 stores t_i as information. A third number designation means 33 makes each of the seventh to ninth processing means 30 to 32 execute its processing with respect to the values of i in descending order from i=n to i=1.

Series t_i is formed in such a manner that the degree of flatness of the controlled state in each time division is maximized (t_i is made constant) while the conditions with respect to b, e, U, D, and L_i are satisfied. According to the above description with reference to FIG. 4, the controlled state or temperature is increased or decreased from t_i to t_(i+1) as indicated by one straight line in the time divisions i in which the controlled state or temperature is not flat. However, the present invention is not limited to this. In the present invention, the temperature in each time division i may be changed according to one's need as indicated by a curved line, a bent and curved line or the like as long as the restrictions on the temperature t_i at the beginning of the time division i and the temperature t_(i+1) at the end are satisfied. In the case of temperature control on the annealing object steel band 12, etc., however, it is desirable from the viewpoint of maintaining the quality that a change in temperature of each annealing object steel band section be flat, i.e., small. There is also a possibility of sudden occurrence of a need to insert an additional item at an urgent request, i.e., a possibility of t_(i+1) being changed. As a method for coping with this, a control method is conceivable in which, for example, if the time division i is comparatively long, the temperature is maintained at t_i until a time close to a limit beyond which t_(i+1) in the next time division i+1 cannot be attained under the restrictions on U and D, that is, the temperature is maintained so that a change therein is flat, and the temperature is changed at U or D in a closing period in the time division i.

FIG. 13 is a flowchart of a physical state control purpose information computation method. The same definitions as (a1) to (a19) described above are given. The physical state control purpose information computation method is not limited to an application to temperature control on annealing object steel band sections constituting an annealing object steel sequence, as in the case of the physical state control purpose information computation apparatus 15. That is, a material on which control is performed by the physical state control purpose information computation method may be, for example, one of a solid, a liquid and a gas, or a combination of any of the solid, liquid and gas as well as the annealing object steel. The physical state is, for example, a dynamic state, an optical state, a thermodynamic state (comprising a temperature state), or an electromagnetic state.

Referring to FIG. 13, in a first processing step S50, X_i is computed from I_i on the basis of (a15) with respect to the given i. In a second processing step S51, Y_i is computed on the basis of the result of computation in the first processing step S50 and (a16) and (a17) with respect to the given i. In a third processing step S52, I_(i+1) is computed on the basis of the result of computation in the second processing step S51 and (a18) and (a19) with respect to the given i. In a fourth processing step S53, I_(i+1), i.e., the result of computation in the third processing step S52, is stored as information with respect to the given i. In a first number designation step S54, the first to fourth processing steps S51 to S53 are executed with respect to the values of i in ascending order from i=1 to i=n.

FIG. 14 is a flowchart of another physical state control purpose information computation method including the same processing as that of the physical state control purpose information computation method shown in FIG. 13, and other additional processing. The same definitions as (b1) to (b4) described above are given. In a fifth processing step S58, s_(i+1) is computed on the basis of (b2) to (b4) with respect to the given i. In a sixth processing step S59, s_(i+1), i.e., the result of computation in the fifth processing step S58, is stored as information with respect to the given i. In a second number designation step S60, the fifth and sixth processing steps S58 and S59 are executed with respect to the values of i in ascending order from i=1 to i=n−1.

FIG. 15 is a flowchart of another physical state control purpose information computation method including the same processing as that of the physical state control purpose information computation method shown in FIG. 14, and other additional processing. The same definitions as (c1) to (c5) described above are given. In a seventh processing step S63, Z_i is computed from t_(i+1) on the basis of (c2) with respect to the given i. In an eighth processing step S64, t_i is computed on the basis of the result of computation in the seventh processing step S63 and (c3) to (c5) with respect to the given i. In a ninth processing step S65, t_i, i.e., the result of computation in the eighth processing step S64, is stored as information with respect to the given i. In a third number designation step S67, the seventh to ninth processing steps S63 to S65 are executed with respect to the values of i in descending order from i=n to i=1.

In the physical state control purpose information computation apparatuses 15 and the physical state control purpose information computation methods described with reference to FIGS. 10 to 15, technical items described below may be added or made concrete singly or in any combination.

The control-processing-object material is one of a solid, a liquid and a gas, or a combination of any of the solid, liquid and gas.

The physical state is a dynamic state, an optical state, a thermodynamic state or an electromagnetic state.

The control-processing-object material is a metal and the physical state is temperature.

The metal is steel to be annealed. The steel to be annealed is formed as a continuous member in which a plurality of lengthwise sections having different annealing temperature upper and lower limits are connected in series in the direction of movement, which is moved at a constant speed, and which undergoes annealing at a predetermined position in the direction of movement. LH_i and LL_i correspond to the upper limit temperature and the lower limit temperature in annealing on the number-i lengthwise section of the continuous member.

FIG. 16 is a diagram of the configuration of hardware for executing a program. The hardware shown in FIG. 16 is made to function as the means in each of the physical state control purpose information computation apparatuses 15 described with reference to FIGS. 10 to 12 to execute a corresponding program. Alternatively, the hardware shown in FIG. 16 is made to execute the steps in each of the physical state control purpose information, computation methods described with reference to FIGS. 13 to 15 to execute a corresponding program. A CPU 71, a main storage unit 72 and an input/output controller 73 are connected to a system bus 70. The above-described means or steps can be executed as a program formed as codes. The input/output controller 73 includes a hard disk interface or the like. Various programs executed by the CPU 71 are stored in a hard disk unit or the like. Each program is stored in the main storage unit 72 before being executed by the CPU 71. The CPU 71 executes the program by successively reading out instruction lines from the main storage unit 72.

FIG. 17 is a functional block diagram of another physical state control purpose information computation apparatus 80. The following is the correspondence relationship between terms used for the physical state control purpose information computation apparatus 80 shown in FIG. 17 and a physical state control purpose information computation method shown in FIG. 18 and the symbols in the above-described definitions (a1) to (a19), (b1) to (b4), and (c1) to (c5).

Limited physical state range in time division: [LL_i, LH_i]

Limit control rate range of physical state controller: U, D

Physical state control range at the beginning of time division: [IL_i, IH_i]

Reachable physical state range: X_i

Physical state control mark value at the beginning of time division: s_i

Physical state control target value: t_i

The physical state control purpose information computation apparatus 80 has three blocks 81, 82, and 83. In a physical state controller (not shown) using information computed by the physical state control purpose information computation apparatus 80, a control time period of a finite length is divided into a plurality of consecutive time divisions. The physical state controller controls a physical state of a control-processing-object material. A limited physical, state range relating to the physical state of the control-processing-object material is set in each time division. The physical state controller changes the physical state of the control-processing-object material at a rate within the corresponding limit control rate range and simultaneously controls the physical state of the control-processing-object material, so that the physical state of the control-processing-object material is within the limited physical state range in the time division.

In the block 81, a time-division-basis reachable physical state range computation means 88 computes a reachable physical state range reachable by the time the given time division ends on the basis of the physical state control range at the beginning of the given time division and the limit control rates of the physical state controller. A time-division-basis physical state control range computation means 89 computes a physical state control range at the beginning of the time division next to the given time division on the basis of the reachable physical state range at the end of the given time division and the limited physical state range in the next time division. An overall physical state control range computation means 90 designates the time divisions in order from the first time division to the last time division in the control time period to make each of the time-division-basis reachable physical state range computation means 88 and the time-division-basis physical state control range computation means 89 repeat executing its processing, thereby obtaining physical state control ranges at the beginnings of all the time divisions.

In the block 82, a time-division-basis physical state control mark value computation means 93 computes a physical state control mark value at the beginning of the time division next to the given time division on the basis of the physical state control mark value at the beginning of the given time division, the physical state control range at the beginning of the next time division and the limit control rates of the physical state controller. An overall physical state control mark value computation means 94 designates the time divisions in order from the first time division to the last time division in the control time period while being given the mark temperature at the beginning of the control time period to make the time-division-basis physical state control mark value computation means 93 repeat executing its processing, thereby obtaining physical state control mark values at the beginnings of all the time divisions.

In the block 83, a time-division-basis physical state target value computation means 97 computes a physical state control target value at the beginning of the time division immediately precedent to the given time division on the basis of the physical state control target value at the beginning of the given time division, the physical state control mark value at the beginning of the immediately preceding time division and the limit control rates of the physical state controller. An overall physical state control target value computation means 98 designates the time divisions in order from the last time division to the first time division in the control time period while being given the control target value at the end of the control time period to make the time-division-basis physical state control target value computation means repeat executing its processing, thereby obtaining physical state control target values at the beginnings of all the time divisions.

FIG. 18 is a flowchart of another physical state control purpose information computation method. This physical state control purpose information computation method has three blocks B101, B102, and B103. In a physical state controller using information computed by this physical state control purpose information computation method, a control time period of a finite length is divided into a plurality of consecutive time divisions. The physical state controller controls a physical state of a control-processing-object material. A limited physical state range relating to the physical state of the control-processing-object material is set in each time division. The physical state controller changes the physical state of the control-processing-object material at a rate within the corresponding limit control rate range and simultaneously controls the physical state of the control-processing-object material so that the physical state of the control-processing-object material is within the limited physical state range in the time division.

In the block B101, in a time-division-basis reachable physical state range computation step S105, a reachable physical state range reachable by the time the given time division ends is computed on the basis of the physical state control range at the beginning of the given time division and the limit control rates of the physical state controller. In a time-division-basis physical state control range computation step S106, a physical state control range at the beginning of the time division next to the given time division is computed on the basis of the reachable physical state range at the end of the given time division and the limited physical state range in the next time division. In an overall physical state control range computation step S107, each of the time-division-basis reachable physical state range computation step S105 and the time-division-basis physical state control range computation step S106 is repeatedly executed by designating the time divisions in order from the first time division to the last time division in the control time period, thereby obtaining physical state control ranges at the beginnings of all the time divisions.

In the block B102, in a time-division-basis physical state control mark value computation step S108, a physical state control mark value at the beginning of the time division next to the given time division is computed on the basis of the physical state control mark value at the beginning of given time division, the physical state control range at the beginning of the next time division and the limit control rates of the physical state controller. In an overall physical state control mark value computation step S109, the time-division-basis physical state control mark value computation step S108 is repeatedly executed by designating the time divisions in order from the first time division to the last time division in the control time period while the mark temperature at the beginning of the control time period is given, thereby obtaining physical state control mark values at the beginnings of all the time divisions.

In the block B103, in a time-division-basis physical state target value computation step S112, a physical state control target value at the beginning of the time division immediately precedent to the given time division is computed on the basis of the physical state control target value at the beginning of the given time division, the physical state control mark value at the beginning of the immediately preceding time division and the limit control rates of the physical state controller. In an overall physical state control target value computation step S113, the time-division-basis physical state control target value computation step is repeatedly executed by designating the time divisions in order from the last time division to the first time division in the control time period while the control target value at the end of the control time period are given, thereby obtaining physical state control target values at the beginnings of all the time divisions.

According to the present invention, as described above, information as to whether control of a physical state of a control-processing-object material satisfying restrictions on a limit heightening rate and a limit lowering rate and physical state control range conditions with respect to time divisions can be performed can be efficiently examined without using dynamic programming. Also, a concrete process of transition of the physical state in which the change in the physical state in each of time divisions is limited can be presented and a physical state transition process in which the physical state of the control-processing-object material at the ending time in the control time period coincides with a given value can be presented.

While the foregoing is directed to embodiments of the present invention, other and further embodiments of the invention may be devised without departing from the basic scope thereof, and the scope thereof is determined by the claims that follow.

REFERENCE NUMERALS

10 . . . steel-manufacturing annealing apparatus
11 . . . temperature control apparatus
12 . . . annealing object steel band
15 . . . physical state control purpose information computation apparatus
16 . . . first processing means
17 . . . second processing means
18 . . . third processing means
19 . . . fourth processing means
20 . . . first number designation means
23 . . . fifth processing means
24 . . . sixth processing means
25 . . . second number designation means
30 . . . seventh processing means
31 . . . eighth processing means
32 . . . ninth processing means
33 . . . third number designation means
80 . . . physical state control purpose information computation apparatus
88 . . . time-division-basis reachable physical state range computation means
89 . . . time-division-basis physical state control range computation means
90 . . . overall physical state control range computation means
93 . . . time-division-basis physical state control mark value computation means
94 . . . overall physical state control mark value computation means
97 . . . time-division-basis physical state control target value computation means
98 . . . overall physical state control target value computation means

The invention claimed is:

1. A physical state control purpose information computation apparatus which computes information used by a physical state controller,
a control time period of a finite length being divided into a plurality of consecutive time divisions, the physical state controller controlling a physical state of a control-processing-object material,
a limited physical state range relating to the physical state of the control-processing-object material being set in each time division,
the physical state controller changing the physical state of the control-processing-object material at a rate within the corresponding limit control rate range and simultaneously controlling the physical state of the control-processing-object material so that the physical state of the control-processing-object material is within the limited physical state range in the time division, said apparatus comprising:
time-division-basis reachable physical state range computation means of computing a reachable physical state range reachable by the time the given time division ends on the basis of the physical state control range at the beginning of the given time division and the limit control rates of the physical state controller;
time-division-basis physical state control range computation means of computing a physical state control range at the beginning of the time division next to the given time division on the basis of the reachable physical state range at the end of the given time division and the limited physical state range in the next time division; and
overall physical state control range computation means of designating the time divisions in order from the first time division to the last time division in the control time period and making each of said time-division-basis reachable physical state range computation means and said time-division-basis physical state control range computation means repeat executing its processing to obtain physical state control ranges at the beginnings of all the time divisions.

2. A physical state control purpose information computation program for making a computer function as each of the means in the physical state control purpose information computation apparatus according to claim 1.

3. A physical state controller which controls a physical state of a control-processing-object material on the basis of physical state control ranges, $I\_i$, $s\_i$ and/or $t\_i$ computed by the physical state control purpose information computation apparatus according to claim 1, $I\_i$, $s\_i$ and/or $t\_i$ corresponding to time divisions i.

4. A physical state control purpose information computation apparatus which computes information used by a physical state controller, a control time period of a finite length being divided into a plurality of consecutive time divisions, the physical state controller controlling a physical state of a control-processing-object material on the basis of conditions relating to the physical state of the control-processing-object material in each of the time divisions through the entire control time period, the following definitions being given (information about n, b, e, LL_i, LH_i, D, and U being given, each index on the right-hand side of "_" representing a number):

(a1) n: the total number of time divisions constituting the control time period (a2) i: the number of each time division in the control time period when the time divisions are successively assigned numbers 1, 2, . . . , n in order from the first time division in time series (a3) b: the value of the physical state of the control-processing-object material at the beginning of the number-1 time division (a4) e: the value of the physical state of the control-processing-object material at the end of the number-n time division (a5) LL_i: a lower limit value of the physical state of the control-processing-object material in the number-i time division (a6) LH_i: an upper limit value of the physical state of the control-processing-object material in the number-i time division (a7) L_i=[LL_i, LH_i], L_(n+1)=[LL_n, LH_n]

(a8) D: a limit heightening rate when the physical state of the control-processing-object material is heightened (a9) U: a limit lowering rate when the physical state of the control-processing-object material is lowered (a10) *: a multiplication operator (a11) T_i: the length of the number-i time division (a12) IL_i: a lower limit of the physical state of the control-processing-object material reachable by the time the number-i time division begins (a13) IH_i: an upper limit of the physical state of the control-processing-object material reachable by the time the number-i time division begins (a14) I_i=[IL_i, IH_i], I_1=[b, b]=b (a15) X_i=[IL_i−D*T_i, IH_i+U*T_i]

(a16) Y_i=X_i⊂L_i when X_i⊂L_i¹f (a17) Y_i=X_i when X_i⊂L_i=f (a18) I_(i+1)=Y_i⊂L_(i+1) when Y_i⊂L_(i+1)¹f (a19) I_(i+1)=Y_i when Y_i⊂L_(i+1)=f, said apparatus comprising:

first processing means of computing X_i from I_i on the basis of said (a15) with respect to a given i;

second processing means of computing Y_i on the basis of the result of computation by said first processing means and said (a16) and (a17) with respect to the given i;

third processing means of computing I_(i+1) on the basis of the result of computation by said second processing means and said (a18) and (a19) with respect to the given i;

fourth processing means of storing, as information, I_(i+1), i.e., the result of computation by said third processing means, with respect to the given i; and first number designation means of making each of said first to fourth processing means execute its processing with respect to the values of i in ascending order from i=1 to i=n.

5. The physical state control purpose information computation apparatus according to claim 4, wherein the following definitions are given:

(b1) s_1=b (b2) s_(i+1)=s_i when s_i∈I_(i+1)

(b3) s_(i+1)=IL_(i+1) when s_i<IL_(i+1)

(b4) s_(i+1)=IH_(i+1) when s_i>IH_(i+1), said apparatus further comprising:

fifth processing means of computing s_(i+1) on the basis of said (b2) to (b4) with respect to the given i;

sixth processing means of storing, as information, s_(i+1), i.e., the result of computation by said fifth processing means, with respect to the given i; and second number designation means of making each of said fifth and sixth processing means execute its processing with respect to the values of i in ascending order from i=1 to i=n−1.

6. The physical state control purpose information computation apparatus according to claim 5, wherein the following definitions are given:

(c1) t_(n+1)=e, (c2) Z_i (:=[ZL_i, ZH_i])=[t_(i+1)−U*T_i, t_(i+1)+D*T_i]

(c3) t_i=s_i when s_i∈Z_i (c4) t_i=ZL_i when s_i<ZL_i (c5) t_i=ZH_i when s_i>ZH_i, said apparatus further comprising:

seventh processing means of computing Z_i from t_(i+1) on the basis of said (c2) with respect to the given i;

eighth processing means of computing t_i on the basis of the result of computation by said seventh processing means and said (c3) to (c5) with respect to the given i;

ninth processing means of storing, as information, t_i, i.e., the result of computation by said eighth processing means, with respect the given i; and third number designation means of making each of said seventh to ninth processing means execute its processing with respect to the values of i in descending order from i=n to i=1.

7. A physical state control purpose information computation program for making a computer function as each of the means in the physical state control purpose information computation apparatus according to claim 5.

8. A physical state control purpose information computation program for making a computer function as each of the means in the physical state control purpose information computation apparatus according to claim 6.

9. A physical state controller which controls a physical state of a control-processing-object material on the basis of physical state control ranges, I_i, s_i and/or t_i computed by the physical state control purpose information computation apparatus according to claim 6, I_i, s_i and/or t_i corresponding to time divisions i.

10. A physical state controller which controls a physical state of a control-processing-object material on the basis of physical state control ranges, I_i, s_i and/or t_i computed by the physical state control purpose information computation apparatus according to claim 5, I_i, s_i and/or t_i corresponding to time divisions i.

11. The physical state control purpose information computation apparatus according to claim 4, wherein the control-processing-object material is one of a solid, a liquid and a gas, or a combination of any of the solid, liquid and gas.

12. A physical state control purpose information computation program for making a computer function as each of the means in the physical state control purpose information computation apparatus according to claim 11.

13. A physical state controller which controls a physical state of a control-processing-object material on the basis of physical state control ranges, I_i, s_i and/or t_i computed by the physical state control purpose information computation apparatus according to claim 11, I_i, s_i and/or t_i corresponding to time divisions i.

14. The physical state control purpose information computation apparatus according to claim 4, wherein the physical state is a dynamic state, an optical state, a thermodynamic state or an electromagnetic state.

15. A physical state control purpose information computation program for making a computer function as each of the means in the physical state control purpose information computation apparatus according to claim 14.

16. A physical state controller which controls a physical state of a control-processing-object material on the basis of physical state control ranges, I_i, s_i and/or t_i computed by the physical state control purpose information computation apparatus according to claim 14, I_i, s_i and/or t_i corresponding to time divisions i.

17. The physical state control purpose information computation apparatus according to claim 4, wherein the control-processing-object material is a metal and the physical state is temperature.

18. The physical state control purpose information computation apparatus according to claim 17, wherein the metal is steel to be annealed; the steel to be annealed is formed as a continuous member in which a plurality of lengthwise sections having different annealing temperature upper and lower limits are connected in series in the direction of movement, which is moved at a constant speed, and which undergoes annealing at a predetermined position in the direction of movement; and LH_i and LL_i correspond to the upper limit temperature and the lower limit temperature in annealing on the number-i lengthwise section of the continuous member.

19. A physical state control purpose information computation program for making a computer function as each of the means in the physical state control purpose information computation apparatus according to claim 18.

20. A physical state controller which controls a physical state of a control-processing-object material on the basis of physical state control ranges, I_i, s_i and/or t_i computed by the physical state control purpose information computation apparatus according to claim 8, I_i, s_i and/or t_i corresponding to time divisions i.

21. A physical state control purpose information computation program for making a computer function as each of the means in the physical state control purpose information computation apparatus according to claim 17.

22. A physical state controller which controls a physical state of a control-processing-object material on the basis of physical state control ranges, I_i, s_i and/or t_i computed by the physical state control purpose information computation apparatus according to claim 17, I_i, s_i and/or t_i corresponding to time divisions i.

23. A physical state control purpose information computation program for making a computer function as each of the means in the physical state control purpose information computation apparatus according to claim 4.

24. A physical state controller which controls a physical state of a control-processing-object material on the basis of physical state control ranges, I_i, s_i and/or t_i computed by the physical state control purpose information computation apparatus according to claim 4, I_i, s_i and/or t_i corresponding to time divisions i.

25. A physical state control purpose information computation method of computing information used by a physical state controller, a control time period of a finite length being divided into a plurality of consecutive time divisions, the physical state controller controlling a physical state of a control-processing-object material, a limited physical state range relating to the physical state of the control-processing-object material being set in each time division, the physical state controller changing the physical state of the control-processing-object material at a rate within the corresponding limit control rate range and simultaneously controlling the physical state of the control-processing-object material so that the physical state of the control-processing-object material is within the limited physical state range in the time division, said method comprising:

a time-division-basis reachable physical state range computation step of computing a reachable physical state range reachable by the time the given time division ends on the basis of the physical state control range at the beginning of the given time division and the limit control rates of the physical state controller;

a time-division-basis physical state control range computation step of computing a physical state control range at the beginning of the time division next to the given time division on the basis of the reachable physical state range at the end of the given time division and the limited physical state range in the next time division; and an overall physical state control range computation step of designating the time divisions in order from the first time division to the last time division in the control time period and repeating executing each of said time-division-basis reachable physical state range computation step and said time-division-basis physical state control range computation step to obtain physical state control ranges at the beginnings of all the time divisions.

26. A physical state control purpose information computation method of computing information used by a physical state controller, a control time period of a finite length being divided into a plurality of consecutive time divisions, the physical state controller controlling a physical state of a control-processing-object material on the basis of conditions relating to the physical state of the control-processing-object material in each of the time divisions through the entire control time period, the following definitions being given (information about n, b, e, LL_i, LH_i, D, and U being given, each index on the right-hand side of "_" representing a number):

(a1) n: the total number of time divisions constituting the control time period (a2) i: the number of each time division in the control time period when the time divisions are successively assigned numbers 1, 2, . . . , n in order from the first time division in time series (a3) b: the value of the physical state of the control-processing-object material at the beginning of the number-1 time division (a4) e: the value of the physical state of the control-processing-object material at the end of the number-n time division (a5) $LL\_i$: a lower limit value of the physical state of the control-processing-object material in the number-i time division (a6) $LH\_i$: an upper limit value of the physical state of the control-processing-object material in the number-i time division (a7) $L\_i=[LL\_i, LH\_i]$, $L\_(n+1)=[LL\_n, LH\_n]$ (a8) D: a limit heightening rate when the physical state of the control-processing-object material is heightened (a9) U: a limit lowering rate when the physical state of the control-processing-object material is lowered (a10) *: a multiplication operator (a11) $T\_i$: the length of the number-i time division (a12) $IL\_i$: a lower limit of the physical state of the control-processing-object material reachable by the time the number-i time division begins (a13) $IH\_i$: an upper limit of the physical state of the control-processing-object material reachable by the time the number-i time division begins (a14) $I\_i=[IL\_i, IH\_i]$, $I\_1=[b, b]=b$ (a15) $X\_i=[IL\_i-D*T\_i, IH\_i+U*T\_i]$ (a16) $Y\_i=X\_i \varsubsetneq L\_i$ when $X\_i \varsubsetneq L\_i^1 f$ (a17) $Y\_i=X\_i$ when $X\_i \varsubsetneq L\_i=f$ (a18) $I\_(i+1)=Y\_i \varsubsetneq L\_(i+1)$ when $Y\_i \varsubsetneq L\_(i+1)^1 f$ (a19) $I\_(i+1)=Y\_i$ when $Y\_i \varsubsetneq L\_(i+1)=f$, said method comprising:

a first processing step of computing $X\_i$ from $I\_i$ on the basis of said (a15) with respect to a given i;

a second processing step of computing $Y\_i$ on the basis of the result of computation in said first processing step and said (a16) and (a17) with respect to the given i;

a third processing step of computing $I\_(i+1)$ on the basis of the result of computation in said second processing step and said (a18) and (a19) with respect to the given i;

a fourth processing step of storing, as information, $I\_(i+1)$, i.e., the result of computation in said third processing step, with respect to the given i; and a first number designation step of executing each of said first to fourth processing steps with respect to the values of i in ascending order from i=1 to i=n.

27. The physical state control purpose information computation method according to claim 26, wherein the following definitions are given:

(b1) $s\_1=b$ (b2) $s\_(i+1)=s\_i$ when $s\_i \hat{\in} L\_(i+1)$ (b3) $s\_(i+1)=IL\_(i+1)$ when $s\_i<IL\_(i+1)$ (b4) $s\_(i+1)=IH\_(i+1)$ when $s\_i>IH\_(i+1)$, said method further comprising:

a fifth processing step of computing $s\_(i+1)$ on the basis of said (b2) to (b4) with respect to the given i;

a sixth processing step of storing, as information, $s\_(i+1)$, i.e., the result of computation in said fifth processing step, with respect to the given i;

a second number designation step of executing each of said fifth and sixth processing steps with respect to the values of i in ascending order from i=1 to i=n−1.

28. The physical state control purpose information computation method according to claim 27, wherein the following definitions are given:

(c1) $t\_(n+1)=e$, (c2) $Z\_i$ $(:=[ZL\_i, ZH\_i])=[t\_(i+1)-U*T\_i, t\_(i+1)+D*T\_i]$ (c3) $t\_i=s\_i$ when $s\_i \hat{\in} Z\_i$ (c4) $t\_i=ZL\_i$ when $s\_i<ZL\_i$ (c5) $t\_i=ZH\_i$ when $s\_i>ZH\_i$, said method further comprising:

a seventh processing step of computing $Z\_i$ from $t\_(i+1)$ on the basis of said (c2) with respect to the given i;

an eighth processing step of computing $t\_i$ on the basis of the result of computation in said seventh processing step and said (c3) to (c5) with respect to the given i;

a ninth processing step of storing, as information, $t\_i$, i.e., the result of computation in said eighth processing step, with respect the given i; and a third number designation step of executing each of said seventh to ninth processing steps with respect to the values of i in descending order from i=n to i=1.

29. The physical state control purpose information computation method according to claim 26, wherein the control-processing-object material is one of a solid, a liquid and a gas, or a combination of any of the solid, liquid and gas.

30. The physical state control purpose information computation method according to claim 26, wherein the physical state is a dynamic state, an optical state, a thermodynamic state or an electromagnetic state.

31. The physical state control purpose information computation method according to claim 26, wherein the control-processing-object material is a metal and the physical state is temperature.

32. The physical state control purpose information computation method according to claim 31, wherein the metal is steel to be annealed; the steel to be annealed is formed as a continuous member in which a plurality of lengthwise sections having different annealing temperature upper and lower limits are connected in series in the direction of movement, which is moved at a constant speed, and which undergoes annealing at a predetermined position in the direction of movement; and $LH\_i$ and $LL\_i$ correspond to the upper limit temperature and the lower limit temperature in annealing on the number-i lengthwise section of the continuous member.

* * * * *